US011156784B1

(12) United States Patent
Leong et al.

(10) Patent No.: US 11,156,784 B1
(45) Date of Patent: Oct. 26, 2021

(54) CONNECTOR ASSEMBLY INSTALLABLE FROM AN EXTERIOR OF A CUSTOMER PREMISES

(71) Applicant: Verizon Patent and Licensing Inc., Basking Ridge, NJ (US)

(72) Inventors: Meaghan Leong, Marshfield, MA (US); Richard J. Kimmick, Asbury, NJ (US); Darrin J. Luce, Morrisville, KY (US); Alex M. Madonna, Spring Lake Heights, NJ (US); Aidan J. O'Donoghue, Marshfield, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/929,674

(22) Filed: Jul. 15, 2020

(51) Int. Cl.
*G02B 6/38* (2006.01)
*G02B 6/36* (2006.01)
*G02B 6/44* (2006.01)

(52) U.S. Cl.
CPC ......... *G02B 6/3825* (2013.01); *G02B 6/3644* (2013.01); *G02B 6/3891* (2013.01); *G02B 6/4459* (2013.01); *G02B 6/3829* (2013.01)

(58) Field of Classification Search
None
See application file for complete search history.

(56) References Cited

U.S. PATENT DOCUMENTS

| 6,425,692 | B1* | 7/2002 | Fujiwara | G02B 6/3897 |
| | | | | 385/56 |
| 6,511,337 | B1* | 1/2003 | Fandrey | H05K 7/1462 |
| | | | | 439/206 |
| 9,494,745 | B2* | 11/2016 | Iizumi | G02B 6/4471 |
| 10,437,002 | B2* | 10/2019 | Rose | H02G 1/083 |
| 10,620,385 | B2* | 4/2020 | Nhep | G02B 6/3851 |
| 2004/0170370 | A1* | 9/2004 | Leppert | G02B 6/502 |
| | | | | 385/136 |

* cited by examiner

Primary Examiner — Rhonda S Peace

(57) ABSTRACT

A connector assembly may include an umbrella jack to be installed via a hole within a wall of a customer premises. The umbrella jack may include an adapter housing, a cap connected to the adapter housing, and an umbrella support connected to the adapter housing and configured to engage an interior surface of the wall. The connector assembly may include a conduit access port to receive the umbrella jack. The conduit access port may include a first opening to receive the umbrella jack and a second opening to attach to the cap of the umbrella jack. The connector assembly may include an outer tube having a third opening to receive the umbrella jack and the conduit access port and may be configured to be provided in the hole within the wall from an exterior of the wall.

20 Claims, 23 Drawing Sheets

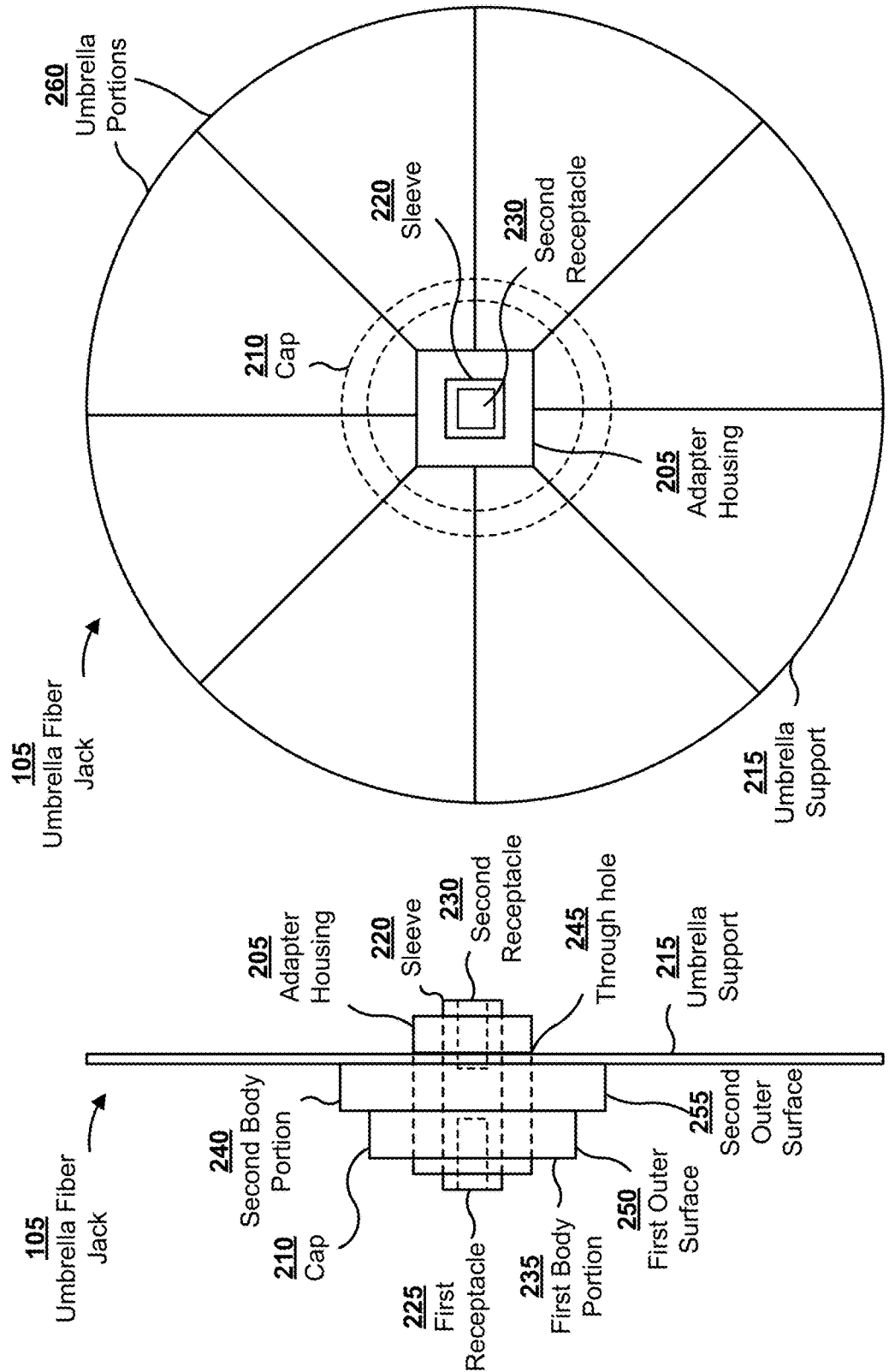

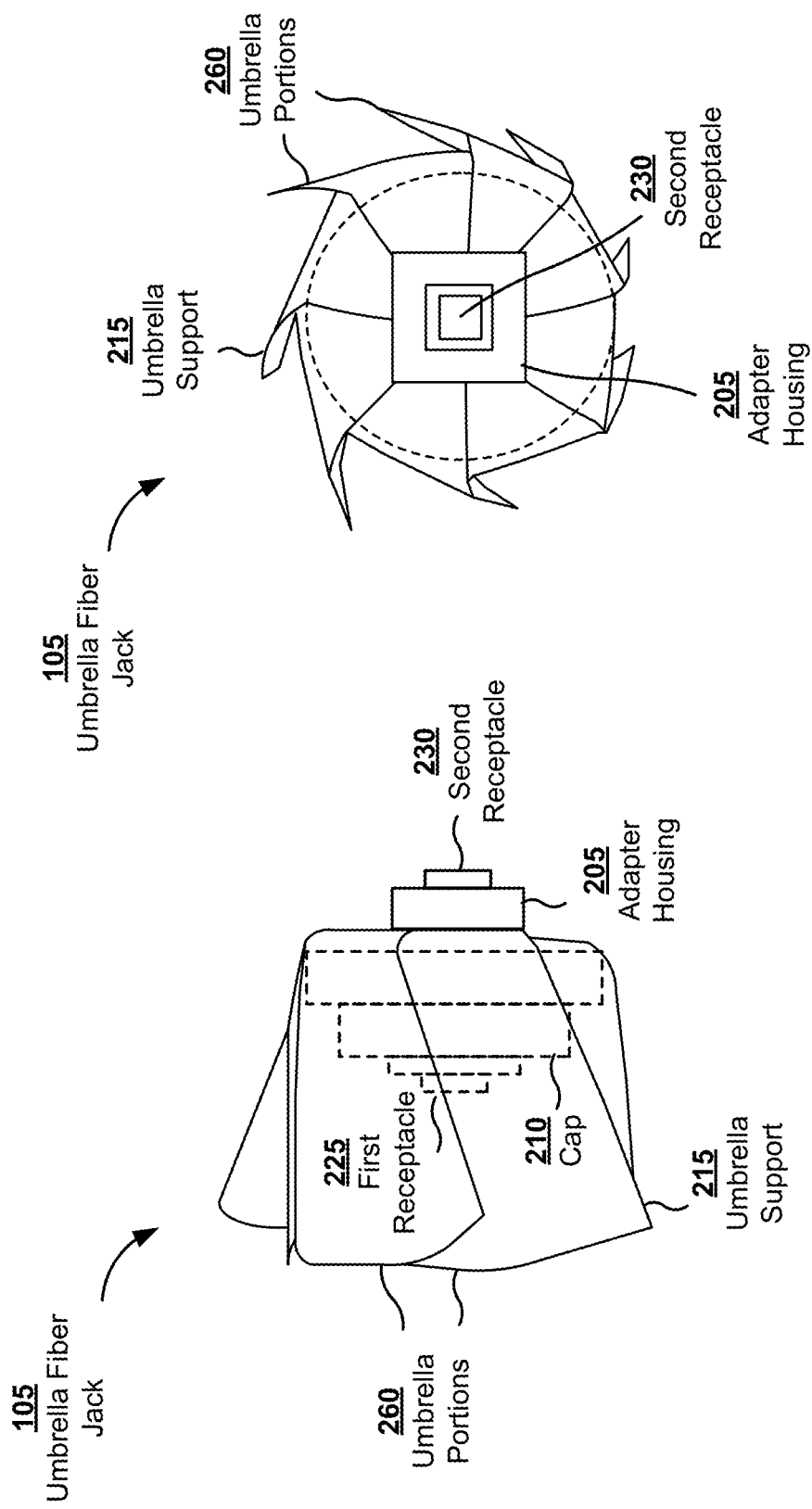

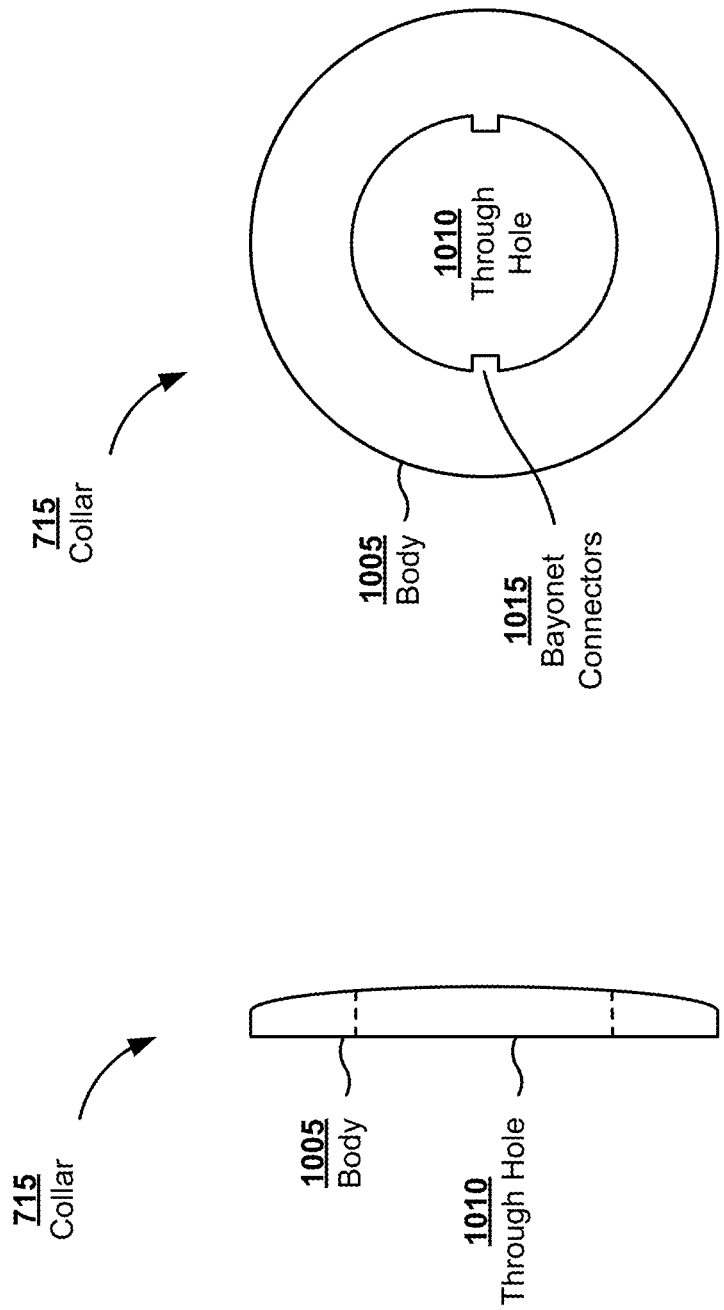

CONNECTOR ASSEMBLY INSTALLABLE FROM AN EXTERIOR OF A CUSTOMER PREMISES

BACKGROUND

A jack (e.g., a fiber jack, an ethernet jack, a digital subscriber line (DSL) jack, and/or the like) may be mounted to an interior surface of a wall of a customer premises. The jack may connect an exterior cable (e.g., an exterior fiber optic cable, an exterior ethernet cable, an exterior DSL cable, and/or the like), which may be routed through a hole in the wall, with an interior cable (e.g., an interior fiber optic cable, an interior ethernet cable, an interior DSL cable, and/or the like).

BRIEF DESCRIPTION OF THE DRAWINGS

FIG. 2A is a side view of an umbrella fiber jack, of the fiber optic connector assembly of FIG. 1, in an open state.

FIG. 2B is a front view of the umbrella fiber jack, of the fiber optic connector assembly of FIG. 1, in the open state.

FIG. 2C is a side view of the umbrella fiber jack, of the fiber optic connector assembly of FIG. 1, in a closed state.

FIG. 2D is a front view of the umbrella fiber jack, of the fiber optic connector assembly of FIG. 1, in the closed state.

FIG. 10A is a side view of a collar of the fiber optic connector assembly of FIG. 7.

FIG. 10B is a front view of the collar of the fiber optic connector assembly of FIG. 7.

DETAILED DESCRIPTION OF PREFERRED EMBODIMENTS

Figure 1:
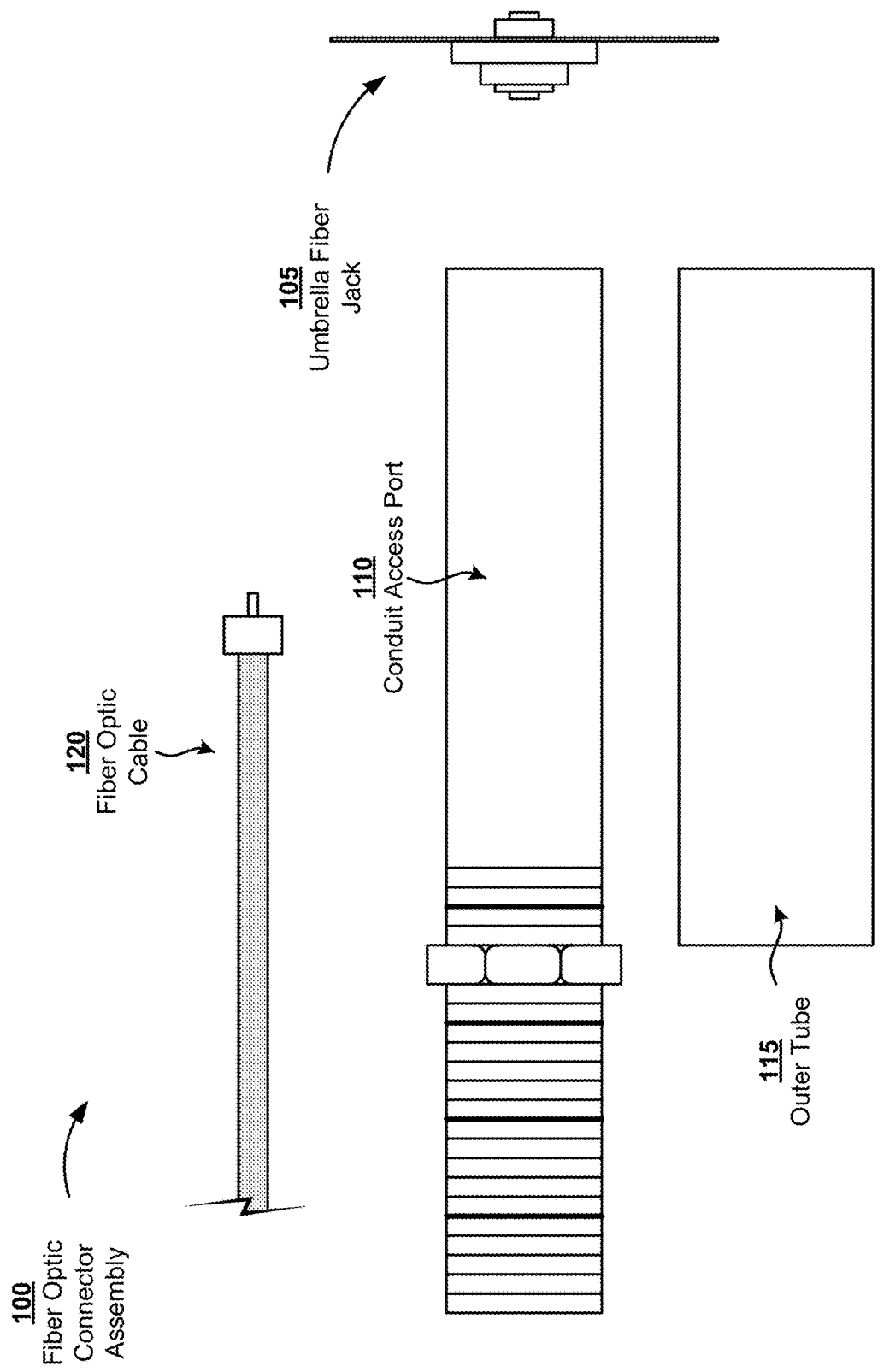
FIG. 1 is a side view of a fiber optic connector assembly, according to one or more aspects of the present disclosure, in a disassembled state.

The following detailed description of example implementations refers to the accompanying drawings. The same reference numbers in different drawings may identify the same or similar elements.

To obtain one or more services (e.g., an Internet service, a television service, a telephone service, a power service, and/or the like) at a customer premises, a customer of a service provider (e.g., an owner of the customer premises, an authorized user of the customer premises, and/or the like) may contact the service provider to purchase a service plan. To arrange for installation of one or more pieces of equipment associated with the one or more services, the customer may schedule a time frame in which an agent of the service provider is to visit the customer premises and complete installation. The time frame may be, for an example, a 2-hour window, a 4-hour window, a 6-hour window, and/or the like.

Upon arrival at the customer premises within the scheduled time frame, the agent of the service provider may route and clamp a cable (e.g., a fiber optic cable, an ethernet cable, a digital subscriber line (DSL) cable, and/or the like) to an exterior surface of a wall of the customer premises. After performing one or more actions to configure the cable for connection inside the customer premises (e.g., stripping the cable, attaching a connector to the cable, and/or the like), the agent may drill a hole in the wall (from the exterior surface of the wall, from an interior surface of the wall, and/or the like) and feed the cable into the customer premises. Based on obtaining permission from the customer, the agent may enter the premises to provide a finished access point to the cable. For example, the agent may cut an opening at a location in the interior surface of the wall that communicates with the hole. After pulling the cable through the opening, the agent may attach an end of the cable to a jack (e.g., a fiber jack, an ethernet jack, a DSL jack, a cable jack, a telephone jack, a power outlet, and/or the like) and mount the jack to the interior surface (e.g., via one or more threaded fasteners screwed into the interior surface, and/or the like). Once the jack is mounted, the agent and/or the customer may connect one or more devices (e.g., an optical network terminal (ONT), a modem, a router, a computer, a television, a telephone, a light, and/or the like) to the jack to obtain the one or more services.

While the jack has a structure that provides the finished access point for the cable, the structure of the jack may necessitate installation via an interior of the customer premises. As a result, depending on circumstances, installation of the cable may be a source of inconvenience for the customer and/or the agent or may not be possible. For example, the service provider may require the customer to return to and/or remain at the customer premises during the time frame to permit the agent to enter. Thus, the customer may take a leave of absence from work, forego pay from work, and/or consume vehicle resources traveling to the customer premises, and/or the like. In some instances, the customer may be unable or unwilling to return to and/or remain at the customer premises during the time frame and therefore be unable to obtain access to the one or more services at the customer premises. In such a case, the service provider may waste resources (e.g., computing resources, network resources, vehicle resources, and/or the like) due to the customer being unavailable (e.g., based on scheduling the agent to visit the customer premises during the time frame, based on the agent traveling to the customer premises and the customer not being available, based on having to reschedule the agent to revisit the customer premises, and/or the like).

As a further example, the service provider may require the agent to visit the customer premises within the time frame regardless of external factors that may inhibit or prevent such a visit (e.g., traffic conditions, weather conditions, public health conditions, and/or the like). Thus, the agent may consume vehicle resources (e.g., power resources, fuel resources, and/or the like) navigating a vehicle to the customer premises around or through an area experiencing traffic delays (e.g., based on a traffic event, such as a vehicle collision, road construction, and/or the like, a weather event, such as a snowstorm, a flood, and/or the like). Additionally, or alternatively, the agent may consume resources taking health precautions to enter the customer premises during a public health event (e.g., an infectious disease outbreak, and/or the like), such as obtaining and wearing protective personal equipment (e.g., a mask, gloves, and/or the like), obtaining and using cleaning agents (e.g., hand sanitizer, bleach, and/or the like), and/or the like. In some instances, due to the public health event, the agent may be unable to enter the customer premises to perform the installation.

Some implementations herein provide a connector assembly that may be installed entirely from outside a customer premises. The connector assembly may include an umbrella jack, a conduit access port to deliver the umbrella jack, and an outer tube to receive the umbrella jack and the conduit access port. The umbrella jack may be configured to be installed via a through-hole provided within a wall of the customer premises and may include an adapter housing, a cap, and an umbrella support. The adapter housing may include a first receptacle to connect to a cable, and a second receptacle coupled to the first receptacle and to be provided inside the customer premises. The cap may be connected to the adapter housing. The umbrella support may be connected to the adapter housing and may engage an interior surface of the wall of the customer premises. The conduit access port may include a first cylindrical portion, a second cylindrical portion, and a threaded fastener. The first cylindrical portion may have a first opening to receive the umbrella jack and include a threaded surface. The second cylindrical portion may be integrally connected to the first cylindrical portion and include a second opening to attach to the cap of the umbrella jack. The threaded fastener may be configured to engage the threaded surface and to secure the conduit access port to the outer tube. The outer tube may have an opening to receive the umbrella jack and the conduit access port and may be configured to be provided in the through-hole provided within the wall of the customer premises from an exterior of the wall.

Because the connector assembly is configured to be installed entirely from outside the customer premises, the connector assembly may eliminate the need for scheduling the time frame and thus improve flexibility in the installation process. As a result, the connector assembly may improve convenience for the customer and/or the agent and conserve resources. For example, because the agent does not need to enter the customer premises to install the cable, the customer may no longer need to take a leave of absence or forego pay from work and may conserve vehicle resources that might otherwise have been consumed traveling to the customer premises, and/or the like. As another example, because the agent may have greater flexibility in installing the connector assembly at the customer premises, the agent may conserve vehicle resources that might otherwise have been consumed navigating a vehicle to the customer premises around or through an area experiencing traffic delays (e.g., based on a traffic event, such as a vehicle collision, road construction, and/or the like, a weather event, such as a snowstorm, a flood, and/or the like). Additionally, or alternatively, the agent may conserve resources that might otherwise have been consumed taking health precautions to enter the customer premises during a public health event (e.g., an infectious disease outbreak, and/or the like), such as obtaining and wearing protective personal equipment (e.g., a mask, gloves, and/or the like), obtaining and using cleaning agents (e.g., hand sanitizer, bleach, and/or the like), and/or the like.

As a further example, the service provider may conserve resources (e.g., computing resources, network resources, vehicle resources, and/or the like) that might otherwise have been consumed due to unavailability of the customer (e.g., based on scheduling the agent to visit the customer premises, based on the agent traveling to the customer premises, and/or the like).

In the description to follow, multiple connector assemblies for fiber optic Internet access will be described. However, it should be understood that the multiple connector assemblies are provided merely as examples. In practice, the multiple connector assemblies may be configured for other types of Internet access (e.g., cable Internet access, DSL Internet access, and/or the like) and/or for access to other types of services (e.g., a television service, a telephone service, a power service, and/or the like). Furthermore, various aspects of the multiple connector assemblies may be combined to form a different connector assembly to accommodate different types of customer premises, different wall sizes, and/or the like.

To simplify explanation below, the same reference numbers may be used to denote like features. The drawings are for illustrative purposes and may not be to scale.

FIG. 1 is a side view of a fiber optic connector assembly 100, according to one or more aspects of the present disclosure, in a disassembled state. The fiber optic connector assembly 100 may include an umbrella fiber jack 105, a conduit access port 110, an outer tube 115, and a fiber optic cable 120. The umbrella fiber jack 105 will be described below in connection with FIGS. 2A-2D. The conduit access port 110 will be described below in connection with FIG. 3. The outer tube 115 will be described below in connection with FIG. 4. The fiber optic cable 120 will be described below in connection with FIG. 5.

The umbrella fiber jack 105, the conduit access port 110, the outer tube 115, and the fiber optic cable 120 may be configured to be attached together and secured to a wall of a customer premises from an exterior of the customer premises. In other words, the umbrella fiber jack 105 is designed to be supported on a wall in an interior of the customer premises from the exterior of the customer premises and without access to the interior of the customer premises.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, differently sized devices, differently shaped devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIG. 2A is a side view of the umbrella fiber jack 105, of the fiber optic connector assembly 100, in an open state. FIG. 2B is a front view of the umbrella fiber jack 105, of the fiber optic connector assembly 100, in the open state. FIG. 2C is a side view of the umbrella fiber jack 105, of the fiber optic connector assembly 100, in a closed state. FIG. 2D is a front view of the umbrella fiber jack 105, of the fiber optic connector assembly 100, in the closed state.

As shown in FIGS. 2A-2D, the umbrella fiber jack 105 may include an adapter housing 205, a cap 210, and an umbrella support 215. The adapter housing 205, as shown in FIG. 2A, may contain a sleeve 220 having a first receptacle 225 optically coupled to a second receptacle 230. The first receptacle 225 may be configured to connect to a first fiber optic cable, which is connected to one or more devices of an Internet service provider. The second receptacle 230 may be configured to connect to a second fiber optic cable that is connected to a device within the customer premises (e.g., an optical network terminal (ONT), a modem, a router, a computer, and/or the like). Thus, once the first fiber optic cable is connected to the second fiber optic cable, via the adapter housing 205, the device may access the Internet.

The adapter housing 205 and/or the sleeve 220 may be formed of a non-conductive material, such as plastic (e.g., polyvinyl chloride (PVC), polyethylene (PE), and/or the like), and may be substantially rectangular prismatic in shape. The adapter housing 205 may be connected to the sleeve 220 via one or more attachment mechanisms, such as a snap-fit mechanism, a threaded mechanism, adhesive, and/or the like. In some implementations, the adapter housing 205 may be integrally formed with the sleeve 220. Other materials and/or shapes are possible.

The cap 210, as shown in FIG. 2A, may include a first body portion 235 and a second body portion 240. The cap 210 may be configured to attach the adapter housing 205 with the conduit access port 110. To attach the cap 210 to the adapter housing 205, cap 210 may include a through-hole 245 that extends through the first body portion 235 and the second body portion 240. The through-hole 245 may be configured to receive and engage with the adapter housing 205. For example, the through-hole 245 may have a substantially rectangular shape and be sized to engage (e.g., frictionally, adhesively, and/or the like) with an outer surface of the adapter housing 205. In some implementations, the cap 210 may be integrally formed with the adapter housing 205.

To attach the cap 210 to the conduit access port 110, the first body portion 235 may be configured to be inserted into and engage with the conduit access port 110. For example, the first body portion 235 may include a first outer surface 250 having a substantially circular shape and being sized to engage (e.g., frictionally, via threads, adhesively, and/or the like) with an inner surface of the conduit access port 110. A second outer surface 255 of the second body portion 240 may likewise be substantially circular and, to facilitate attachment of the cap 210 to the conduit access port 110, may define a diameter larger than a diameter of the first outer surface 250 of the first body portion 235. The diameter of the second outer surface 255 of the second body portion 240 of the cap 210 may be substantially equal to a diameter of the conduit access port 110, which will be described in connection to FIG. 3 below.

The first body portion 235 and/or the second body portion 240 may be formed of a non-conductive material, such as plastic (e.g., PVC, PE, and/or the like). The first body portion 235 may be connected to the second body portion 240 via one or more attachment mechanisms, such as adhesive, a snap-fit mechanism, a threaded mechanism, and/or the like. In some implementations, the first body portion 235 may be integrally formed with the second body portion 240.

The umbrella support 215, as shown in FIGS. 2A-2D, may include a plurality of umbrella portions 260 (e.g., eight umbrella portions, six umbrella portions, and/or the like), which may allow the umbrella support 215 to expand and contract. The plurality of umbrella portions 260 may be configured to move between a substantially open position, which is shown in FIGS. 2A-2B, and a substantially closed position, which is shown in FIGS. 2C-2D. Due to a resilient property of the plurality of umbrella portions 260 and/or one or more biasing mechanisms (e.g., one or more torsional springs, leaf springs, and/or the like) positioned adjacent to the plurality of umbrella portions 260, the plurality of umbrella portions 260 may be configured to maintain and/or return to the substantially open position. As shown in FIGS. 2C-2D, the umbrella support 215 may be configured to contract to a diameter less than a diameter of the outer tube 115, which will be described below in connection with FIG. 4, to enable the fiber optic connector assembly 100 to be inserted through the outer tube 115 and a through-hole of a customer premises. Once inside the customer premises, the umbrella support 215 may be configured to expand (e.g., due to a spring force provided by the plurality of umbrella portions 260 and/or one or more biasing mechanisms) to form a wall mount on a surface of an inner wall of the customer premises.

The plurality of umbrella portions 260 may be formed of a non-conductive and/or resilient material, such a thermoplastic elastomer (TPE), PVC, PE, and/or the like. The plurality of umbrella portions 260 may be mounted on the adapter housing 205 via one or more attachment mechanisms, such as adhesive, one or more snap-fit mechanisms, one or more tongue-and-groove mechanisms, and/or the like. In some implementations, the plurality of umbrella portions 260 may be integrally formed with the adapter housing 205. Alternatively, or additionally, the plurality of umbrella portions 260 may be connected (e.g., either integrally or via one or more attachment mechanisms) to the second outer surface 255 of the cap 210 or to another surface of the fiber optic connector assembly 100. When the umbrella portions 260 are in the substantially open position, as shown in FIGS. 2A-2B, the umbrella support 215 may have a diameter in a range from approximately 5.1 centimeters (cm) to approximately 7.6 cm. For example, the diameter may be approximately 5.7 cm. When the umbrella portions 260 are in the substantially closed position, as shown in FIGS. 2C-2D, the umbrella support 215 may have a diameter in a range from approximately 2 cm to approximately 2.15 cm. For example, the diameter may be approximately 2.05 cm.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, differently sized devices, differently shaped devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D. For example, while the umbrella support 215 is shown as having a circular shape in the open state, it should be understood that other shapes are possible (e.g., square, rectangular, oval, triangular, pentagonal, hexagonal, and/or the like).

Figure 3:
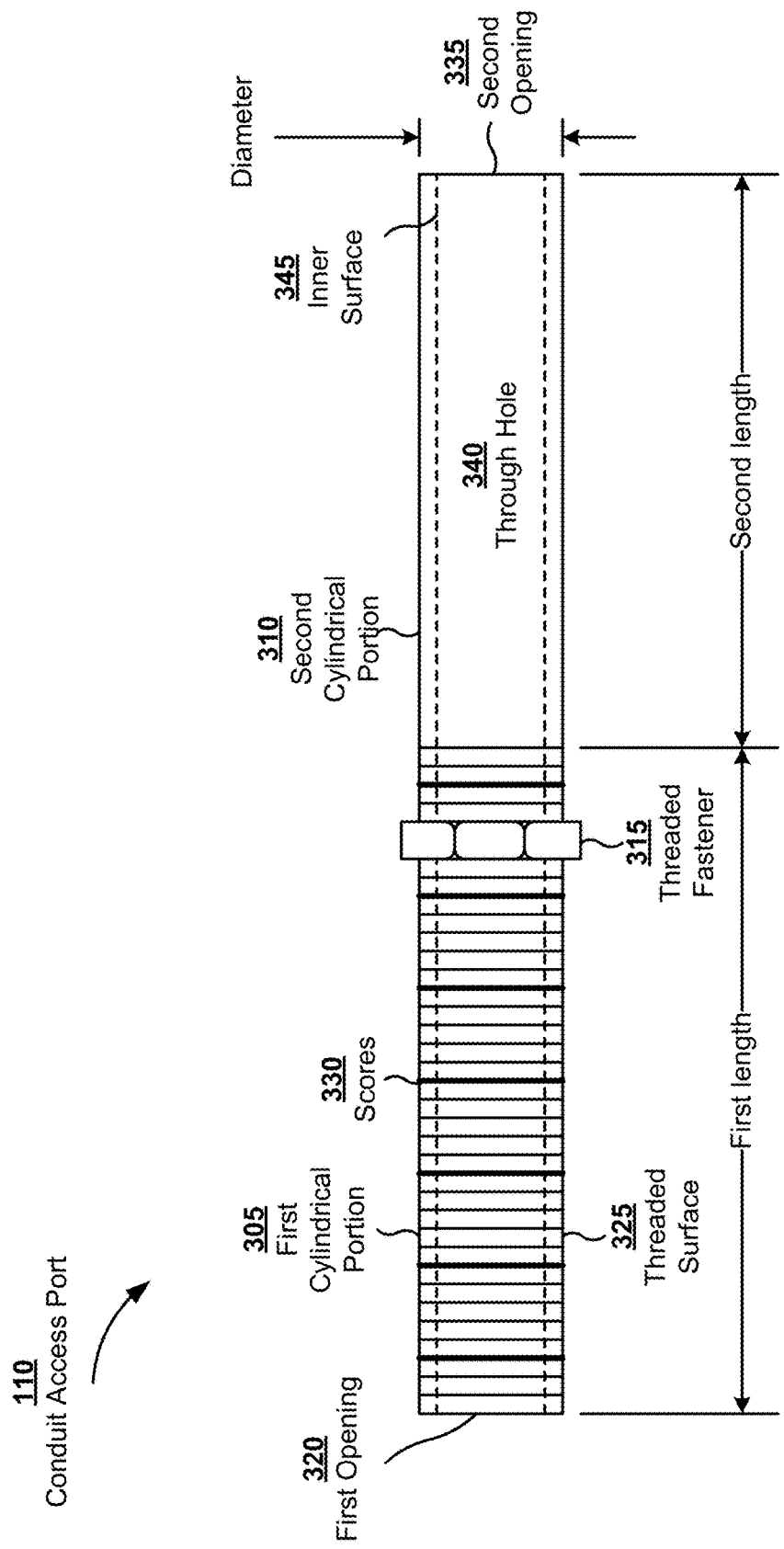
FIG. 3 is a side view of a conduit access port of the fiber optic connector assembly of FIG. 1.

FIG. 3 is a side view of the conduit access port 110 of the fiber optic connector assembly 100. As shown in FIG. 3, the conduit access port 110 may include a first cylindrical portion 305, a second cylindrical portion 310 integrally connected to the first cylindrical portion 305, and a threaded fastener 315. The first cylindrical portion 305 may include a first opening 320, which is configured to receive the umbrella fiber jack 105 when the umbrella fiber jack 105 is in the closed state, and a threaded surface 325 that is configured to engage with the threaded fastener 315. The threaded surface 325 may have a plurality of scores 330 spaced apart along a length of the first cylindrical portion 305. For example, the plurality of scores 330 may be spaced approximately 1.25 cm apart along the length of the first cylindrical portion 305. A score 330, of the plurality of scores 330, may cut into and substantially encircle the threaded surface 325 to allow the conduit access port 110 to be trimmed at a location of the score 330.

The second cylindrical portion 310 may include a second opening 335 that communicates with the first opening 320 to define a through-hole 340 in the conduit access port 110. The second opening 335 may be configured to receive and attach to the first body portion 235 of the cap 210 of the umbrella fiber jack 105. To attach to the first body portion 235, as described above in connection with FIGS. 2A-2D, the second opening 335 may include the inner surface 345, which may engage with the first outer surface 250 of the first body portion 235 (e.g., frictionally, via threads, adhesively, and/or the like). For example, the inner surface 345 of the conduit access port 110 may have a constant diameter that is substantially the same as a constant diameter of the first outer surface 250 of the first body portion 235. In such an example, the umbrella fiber jack 105 may be attached to the conduit access port 110 via a frictional and/or adhesive engagement. As another example, the inner surface 345 of the conduit access port 110 may include a thread that is configured to engage with a corresponding thread on the first outer surface 250 of the first body portion 235. In such an example, the umbrella fiber jack 105 may be attached to the conduit access port 110 via a threaded engagement.

The first cylindrical portion 305 and/or the second cylindrical portion 310 may be formed of a non-conductive material, such as plastic (e.g., PVC, PE, and/or the like). The first cylindrical portion 305 may have a first length in a range from approximately 14 cm to approximately 16.5 cm and a first diameter of at least 1.9 cm. For example, the first length may be approximately 14 cm, and the first diameter may be approximately 1.9 cm. The second cylindrical portion 310 may have a second length in a range from approximately 11.4 cm to approximately 14 cm and a second diameter of at least 1.9 cm. For example, the second length may be approximately 11.4 cm, and the second diameter may be approximately 1.9 cm. The first length and the second length may together define a length of the conduit access port 110. For example, the length may approximately 25.4 cm. The first diameter may be equal to the second diameter. Other materials and/or sizes are possible.

The threaded fastener 315 includes a structure that is configured to threadably engage with the threaded surface 325 of the first cylindrical portion 305. For example, the threaded fastener 315 may include a hex nut, a wing nut, and/or the like. The threaded fastener 315 may be utilized to secure the conduit access port 110 to a wall of a customer premises (as will be described below in connection to FIGS. 6D-6G) and complete installation of the fiber optic connector assembly 100.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, differently sized devices, differently shaped devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
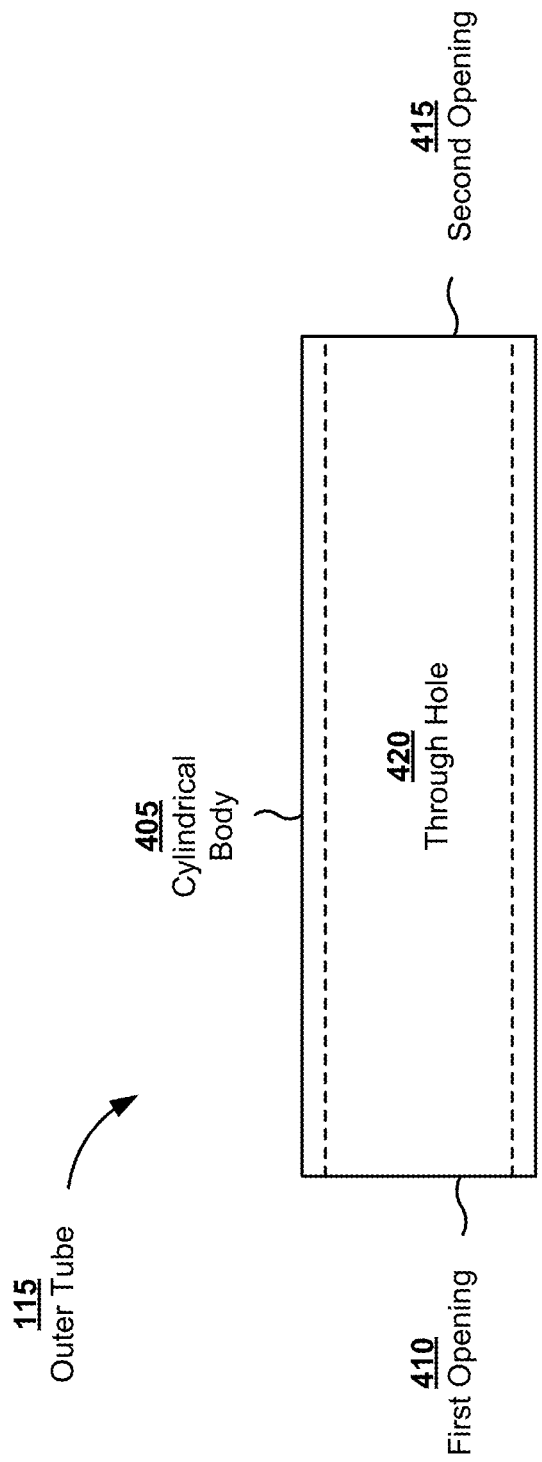
FIG. 4 is a side view of an outer tube of the fiber optic connector assembly of FIG. 1.

FIG. 4 is a side view of the outer tube 115 of the fiber optic connector assembly 100. As shown in FIG. 4, the outer tube 115 may include a cylindrical body 405 having a first opening 410 and a second opening 415 that define a through-hole 420. The outer tube 115 may be configured to be positioned within a through-hole of a wall (as will be described below in connection with FIG. 6D) to facilitate insertion of the umbrella fiber jack 105 into an interior of a customer premises. For example, the first opening 410 may be configured to receive the umbrella fiber jack 105 to allow the umbrella fiber jack 105 to be pushed along the through-hole 420 and emerge from the second opening 415.

The outer tube 115 may be formed of a non-conductive material, such as plastic (e.g., PVC, PE, and/or the like). The outer tube 115 may have a length less than the length of the conduit access port 110 and a diameter greater than the first diameter of the first cylindrical portion 305 or the second diameter of the second cylindrical portion 310. For example, the length may be in a range from approximately 11.4 cm to approximately 24.1 cm, and the diameter may be in a range from approximately 2.2 cm to approximately 2.5 cm. As a further example, the length may be approximately 20.3 cm, and the diameter may be approximately 2.5 cm. Other materials and/or sizes are possible.

As indicated above, FIG. 4 is provided as an example. Other examples may differ from what is described with regard to FIG. 4. For example, there may be additional devices, fewer devices, different devices, differently sized devices, differently shaped devices, or differently arranged devices than that shown in FIG. 4.

Figure 5:
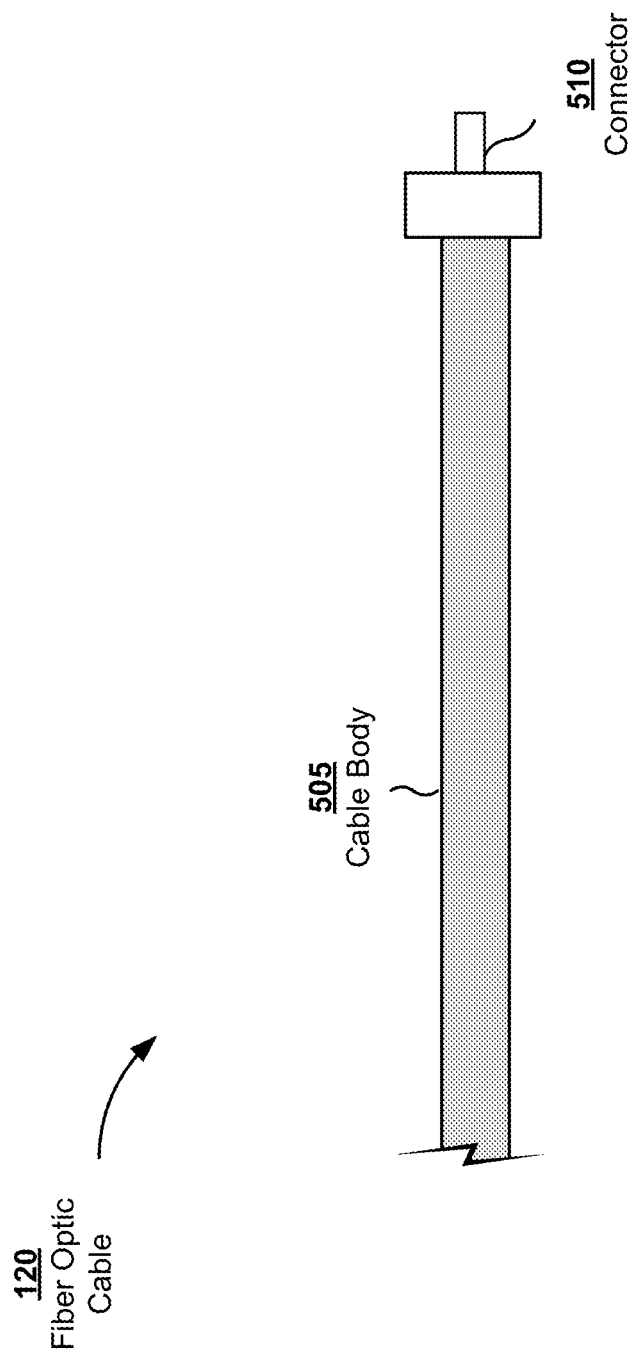
FIG. 5 is a side view of a fiber optic cable of the fiber optic connector assembly of FIG. 1.

FIG. 5 is a side view of the fiber optic cable 120 of the fiber optic connector assembly 100, which may be the first fiber optic cable as described above in connection with FIGS. 2A-2D. As shown in FIG. 5, the fiber optic cable 120 may include a cable body 505 and a connector 510 attached to an end thereof. The cable body 505 may include one or more optical fibers, which are configured to transmit data in the form of light pulses along a length thereof. To protect the one or more optical fibers, the cable body 505 may include a plurality of steel wires and one or more layers of material (e.g., copper, aluminum, polycarbonate, PE, and/or the like) that surround the one or more optical fibers. The connector 510 may include a standard connector, a straight tip connector, a ferrule connector, a physical contact connector, an angled physical contact connector, an ultra-physical contact connector, and/or the like. The connector 510 may be configured to be inserted into and secured within the first receptacle 225 of the umbrella fiber jack 105 to allow the data to be transmitted from the one or more optical fibers within the cable body 505 to a device (e.g., an ONT, a modem, a router, a computer, and/or the like) within a customer premises.

As indicated above, FIG. 5 is provided as an example. Other examples may differ from what is described with regard to FIG. 5. For example, there may be additional devices, fewer devices, different devices, differently sized devices, differently shaped devices, or differently arranged devices than that shown in FIG. 5.

Figure 6A:
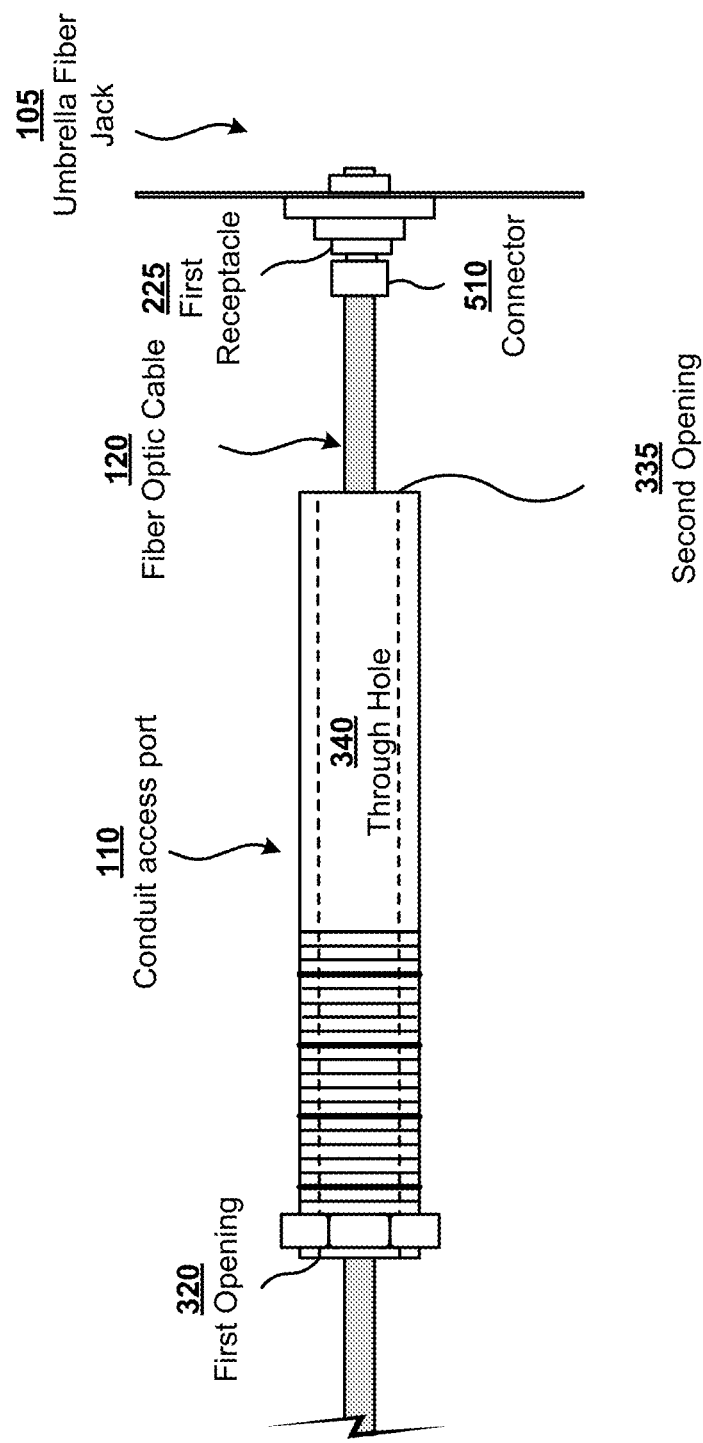
FIGS. 6A-6G are side views of the fiber optic connector assembly of FIG. 1 being utilized in an installation process.
Figure 6B:
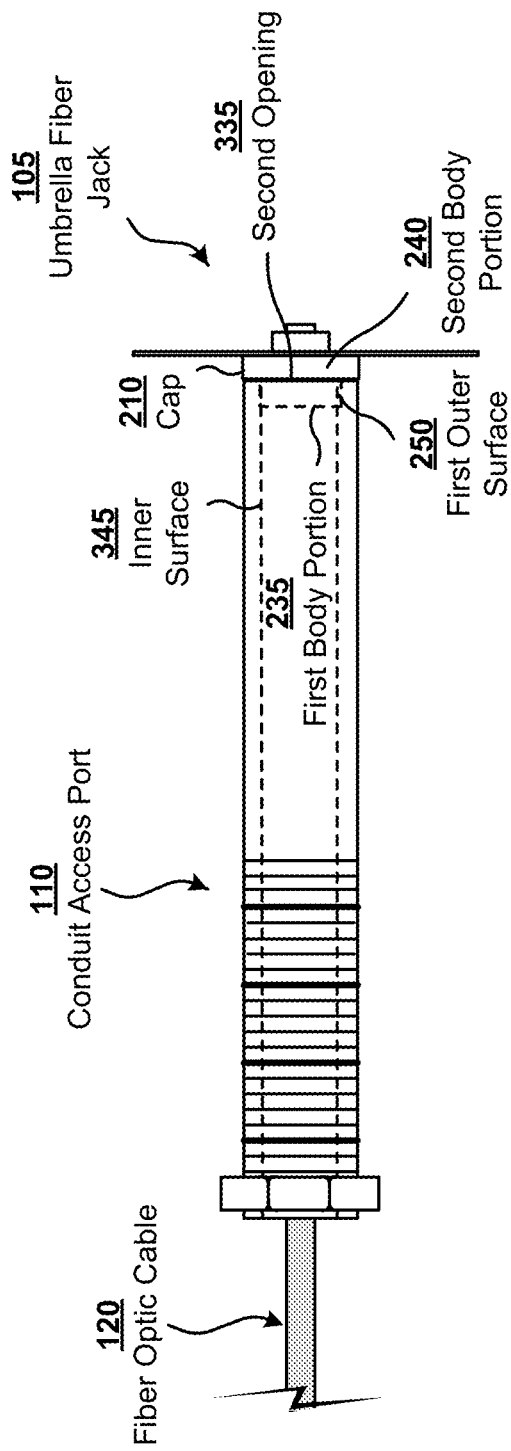
Figure 6C:
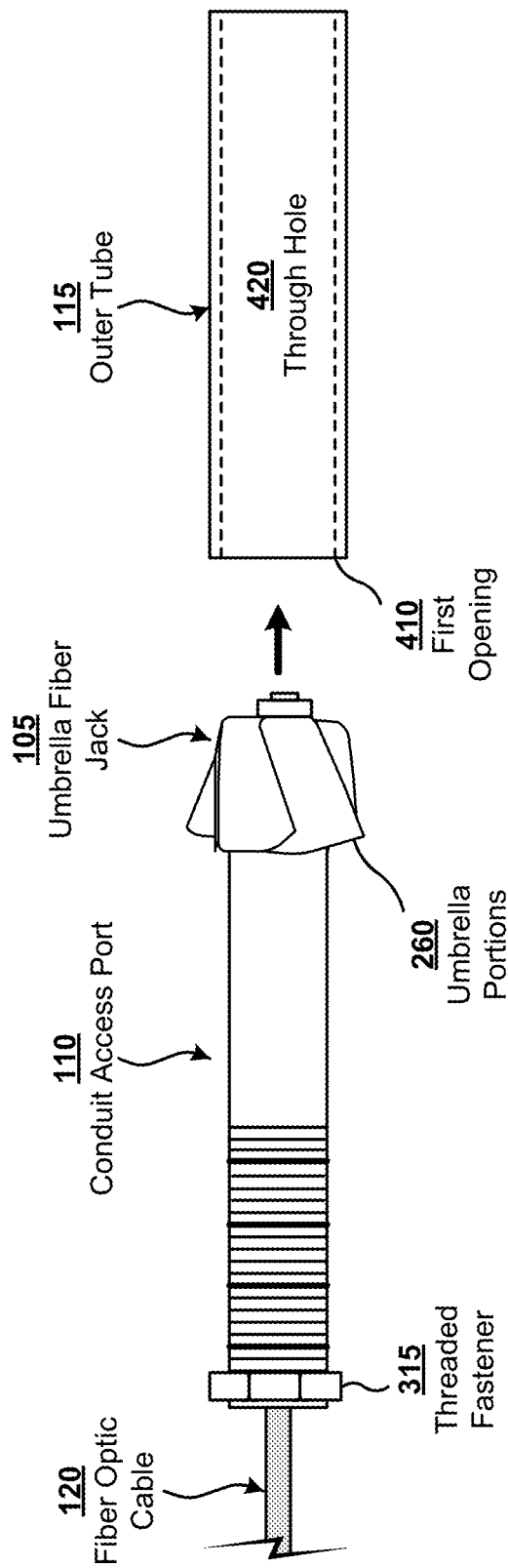
Figure 6D:
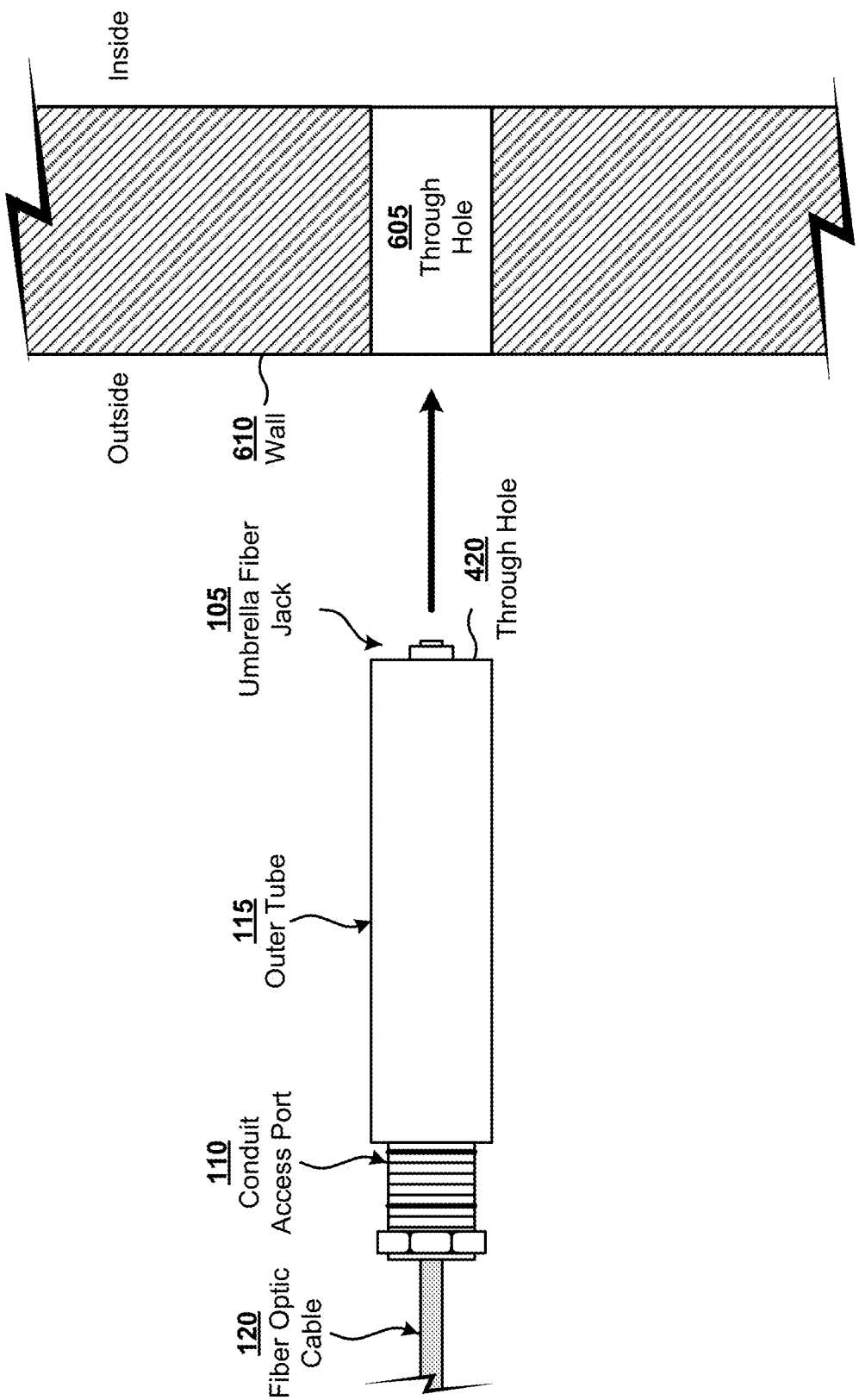
Figure 6E:
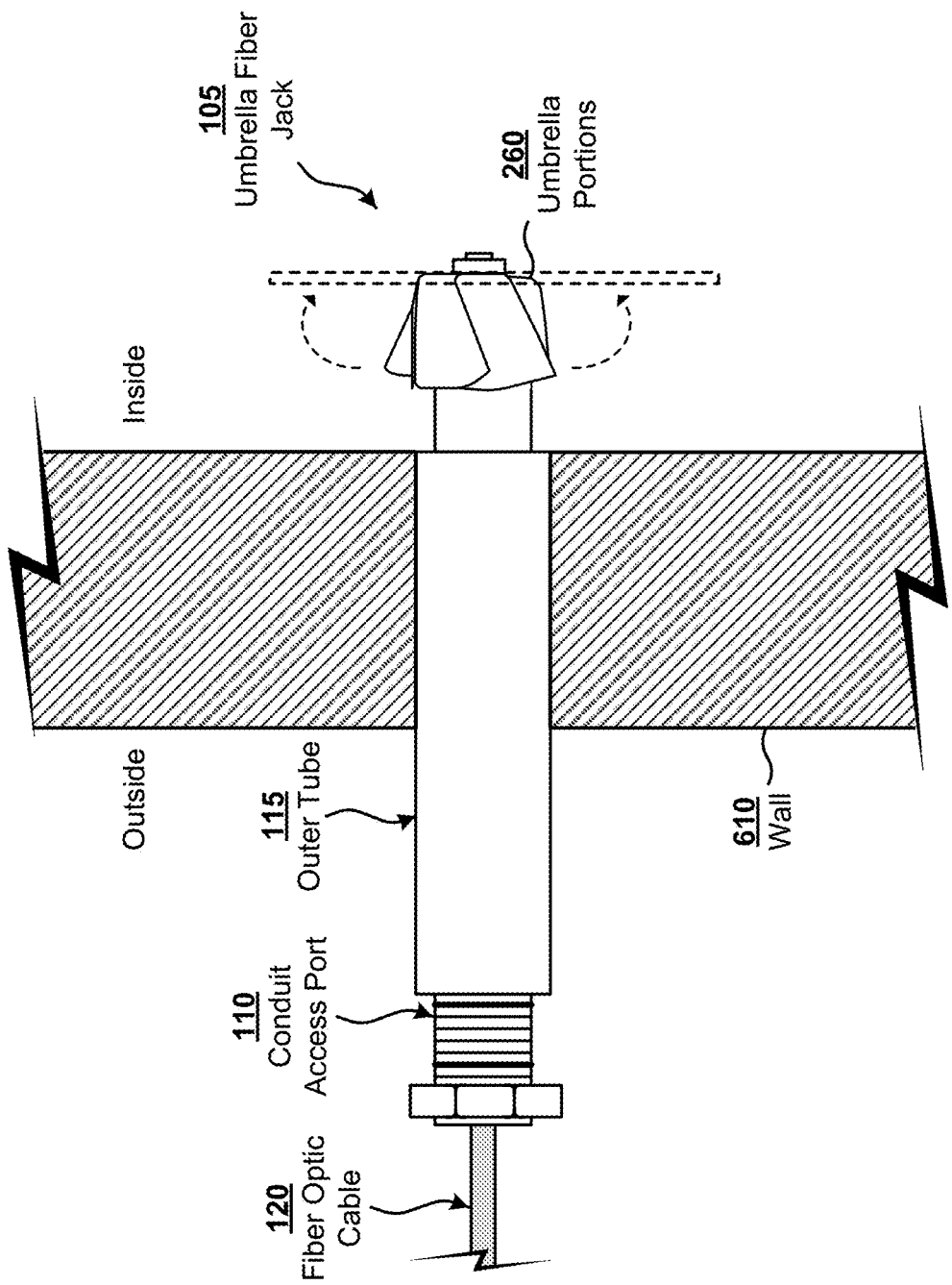
Figure 6F:
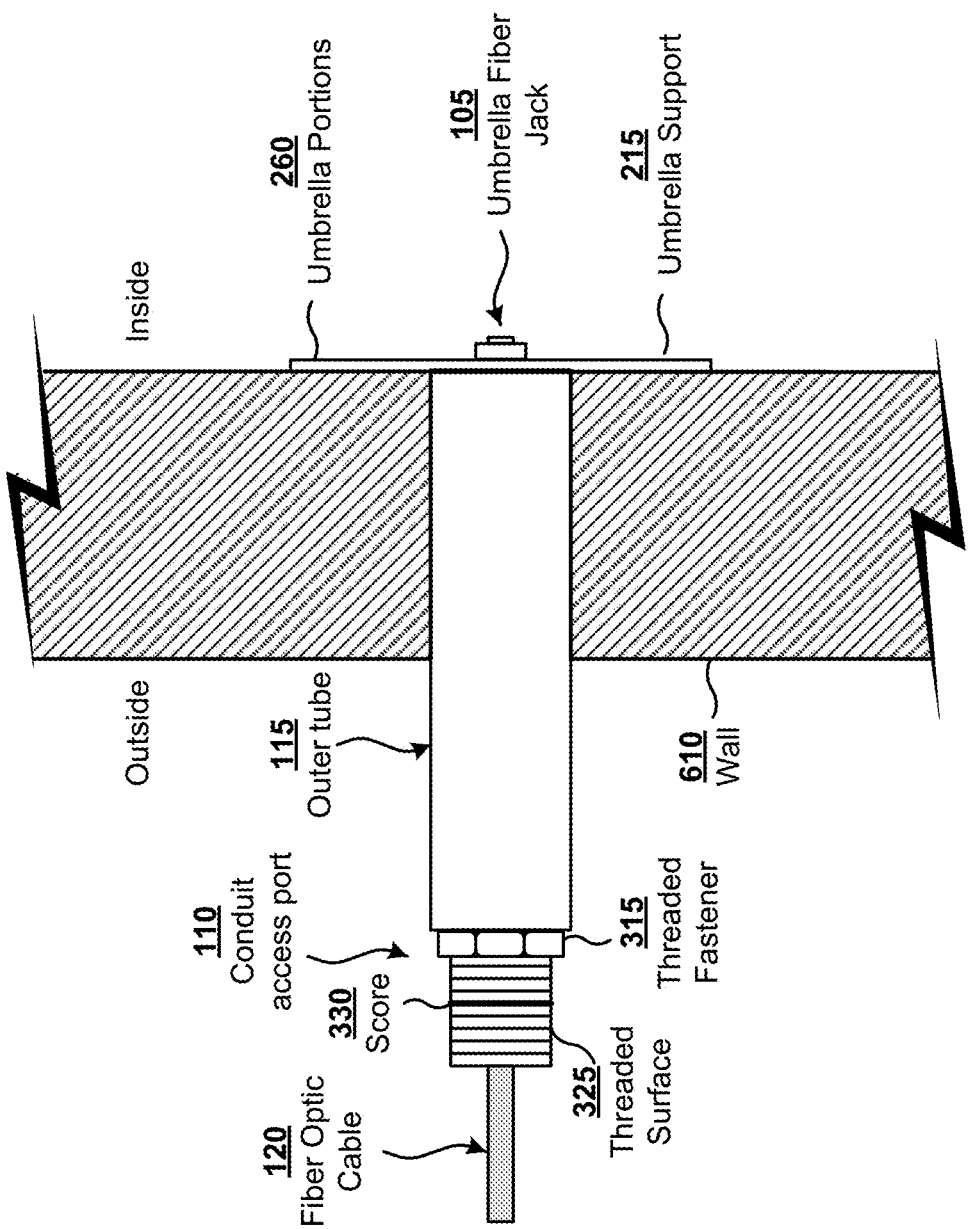
Figure 6G:
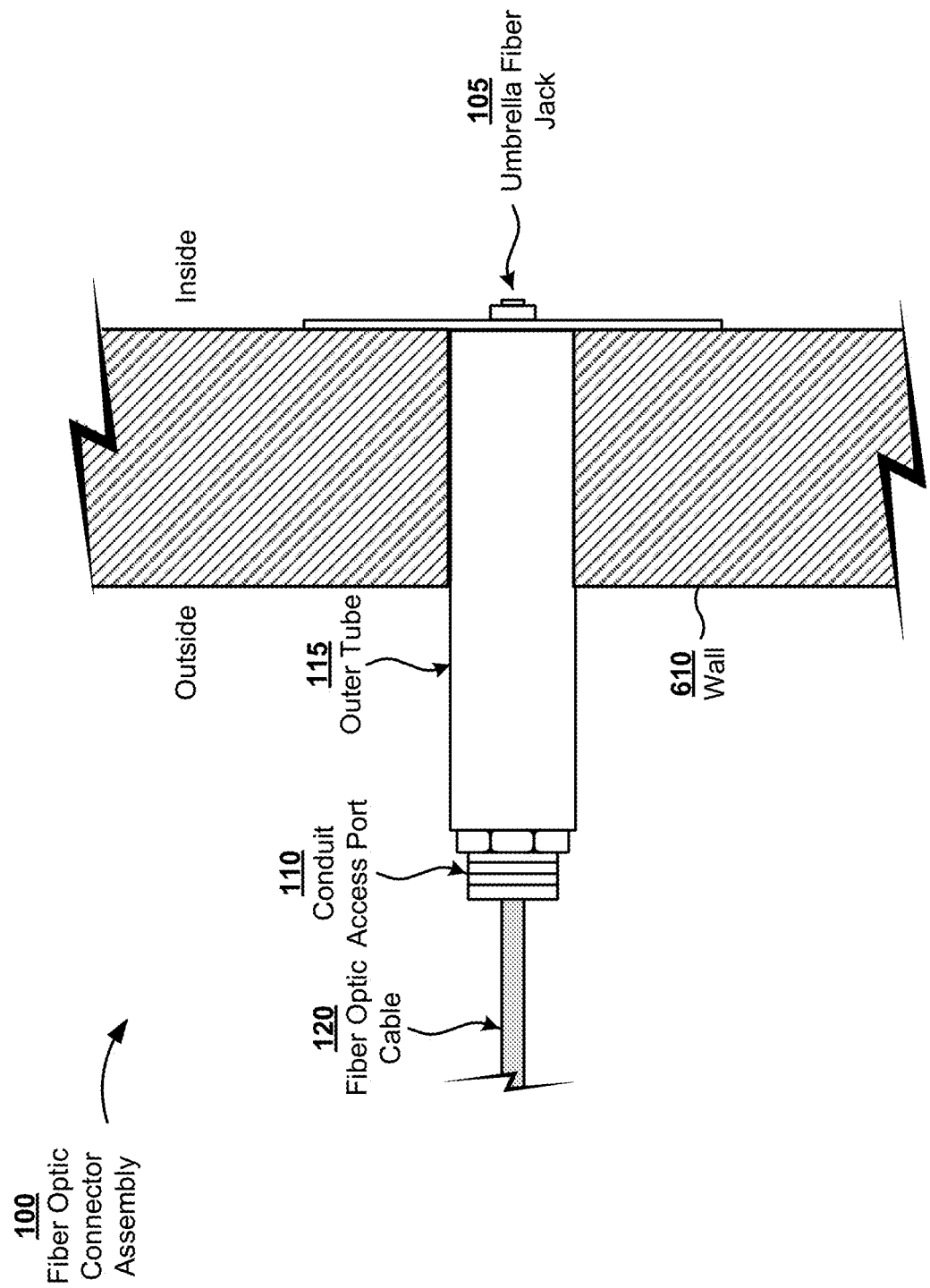

FIGS. 6A-6G are side views of the fiber optic connector assembly 100 being utilized in an installation process. FIG. 6A is a side view of the fiber optic cable 120 being fed through the conduit access port 110 and connected to the umbrella fiber jack 105. FIG. 6B is a side view of the umbrella fiber jack 105, along with the fiber optic cable 120, being attached to the conduit access port 110. FIG. 6C is a side view of the umbrella fiber jack 105, along with the fiber optic cable 120 and the conduit access port 110, being inserted into the outer tube 115. FIG. 6D is a side view of the umbrella fiber jack 105, along with the fiber optic cable 120, the conduit access port 110, and the outer tube 115, being inserted into the through-hole 605 of the wall 610 of a customer premises. FIG. 6E is a side view of the umbrella fiber jack 105, along with the fiber optic cable 120 and the conduit access port 110, being pushed through the outer tube 115 such that the umbrella fiber jack 105 is exposed inside the customer premises. FIG. 6F is a side view of the umbrella fiber jack 105, along with the fiber optic cable 120 and the conduit access port 110, being pulled toward the wall 610 such that the umbrella support 215 of the umbrella fiber jack 105 is positioned against an interior surface of the wall 610, and the threaded fastener being threaded onto the conduit access port 110 to contact the outer tube 115. FIG. 6G is a side view of the fiber optic connector assembly 100 in a final state of the installation process after the conduit access port 110 has been trimmed.

For FIGS. 6A-6G, assume that a customer of a service provider contacted the service provider to obtain an Internet service plan and/or provide a request for installation of the fiber optic connector assembly 100 at a customer premises. The request for the installation may include an address of the customer premises, a requested time frame for the installation to occur, one or more requested installation points at the customer premises (e.g., a section of the wall 610 in which the through-hole 605 is to be provided), and/or the like. Based on the request for the installation, an agent of the service provider (e.g., a technician, a fiber optic specialist, and/or the like) may obtain and bring installation equipment, including the umbrella fiber jack 105, the conduit access port 110, the outer tube 115, the connector 510, and one or more tools (e.g., a drill, a wire stripper, and/or the like) to the customer premises. Once on-site, the agent of the service provider may route the cable body 505 to the customer premises (e.g., from a pole or other structure near the customer premises) and attach the connector 510 to the cable body 505 to form the fiber optic cable 120. While remaining outside the customer premises, the agent may begin the installation process at a selected installation point of the one or more requested installation points at the customer premises.

As shown in FIG. 6A, the agent may attach the fiber optic cable 120 with the umbrella fiber jack 105. For example, the agent may insert the fiber optic cable 120 into the first opening 320 of the conduit access port 110 and feed the fiber optic cable 120 through the through-hole 340. After pushing the fiber optic cable 120 through the second opening 335 of the conduit access port 110, the agent may insert the connector 510 of the fiber optic cable 120 into the first receptacle 225 of the umbrella fiber jack 105. The connector 510 may attach with the first receptacle 225 via one or more attachment mechanisms (e.g., a snap-fit mechanism, a threaded mechanism, a twist mechanism, and/or the like).

As shown in FIG. 6B, the agent may attach the umbrella fiber jack 105, along with fiber optic cable 120, with the conduit access port 110. For example, the agent may insert the first body portion 235 of the cap 210 of the umbrella fiber jack 105 into the second opening 335 of the conduit access port 110. The first outer surface 250 of the first body portion 235 may engage (e.g., frictionally, threadably, adhesively, and/or the like) the inner surface 345 of the conduit access port 110 to define an attachment. Thus, because the fiber optic cable 120 is secured to the umbrella fiber jack 105, which is in turn secured to the conduit access port 110, the fiber optic cable 120, the umbrella fiber jack 105, and the conduit access port 110 may be held together as a subassembly unit.

As shown in FIG. 6C, the agent may insert the umbrella fiber jack 105, along with the fiber optic cable 120 and the conduit access port 110, into the outer tube 115. For example, the agent may fold the umbrella portions 260 of the umbrella fiber jack 105 into the substantially closed position and insert the subassembly unit into the first opening 410 of the outer tube 115. Because the threaded fastener 315 is attached to an end of the conduit access port 110, the threaded fastener 315 may prevent the end of the conduit access portion 110 from being inserted into the through-hole 420 of the outer tube 115 and to thus remain accessible by the agent.

As shown in FIG. 6D, while the agent remains outside of the customer premises, the agent may press a drill into an exterior surface of the selected installation point of the wall 610 to provide the through-hole 605 in the wall 610. The agent may insert the umbrella fiber jack 105, along with the fiber optic cable 120, the conduit access port 110, and the outer tube 115, into the through-hole 605 of the wall 610. For example, the agent may hold the subassembly unit within the through-hole 420 of the outer tube 115 and push the subassembly unit and the outer tube 115 through the through-hole 605 and into the customer premises.

As shown in FIG. 6E, the agent may push the umbrella fiber jack 105, along with the fiber optic cable 120 and the conduit access port 110, through the outer tube 115 such that the umbrella fiber jack 105 is exposed inside the customer premises. For example, while holding the outer tube 115, the agent may grasp and push an end of the conduit access port 110 to drive the subassembly unit through the outer tube 115. Once the umbrella fiber jack 105 emerges from the outer tube 115 inside the customer premises, the umbrella portions 260 of the umbrella fiber jack 105 may resiliently return to the substantially open position.

As shown in FIG. 6F, the agent may pull the umbrella fiber jack 105, along with the fiber optic cable 120 and the conduit access port 110, toward the wall 610 such that the umbrella support 215 of the umbrella fiber jack 105 is positioned against an interior surface of the wall 610. For example, while holding the outer tube 115, the agent may grasp and pull the end of the conduit access port 110 to cause the umbrella portions 260 of the umbrella fiber jack 105 to abut the wall 610 and create a seal. In some implementations, at this point in the installation process, the agent may contact the customer to confirm that the umbrella portions 260 are positioned against the interior surface of the wall 610. Additionally, or alternatively, the agent may ensure that the umbrella portions 260 are so positioned by comparing a number of measurements. For example, prior to inserting the subassembly unit and the outer tube 115 (e.g., as discussed above in connection with FIG. 6D), the agent may measure a depth of the wall 610 and/or the length of the conduit access port 110. After the agent pulls the subassembly unit toward the wall 610 to create the seal, the agent may compare the depth of the wall 610 with a non-exposed length of the conduit access port 110 (e.g., by subtracting an exposed length of the conduit access port 110 from the length of the conduit access port 110) to verify that the depth is equal to the non-exposed length.

As further shown in FIG. 6F, the agent may thread the threaded fastener 315 onto the conduit access port 110 to clamp the outer tube 115 between the threaded fastener 315 and the umbrella support 215. For example, the agent may twist the threaded fastener 315 (e.g., manually, using a wrench, and/or the like) along the threaded surface 325 until the threaded fastener 315 contacts an end of the outer tube 115. Thus, by threading the threaded fastener 315 onto the conduit access port 110, the agent may secure the umbrella fiber jack 105, the conduit access port 110, the outer tube 115, and the fiber optic cable 120 to the wall 610 of the customer premises.

In some implementations, to complete the installation process, the agent may trim the conduit access port 110. For example, the agent may cut the conduit access port 110 along a score 330, of the plurality of scores 330, and remove a portion of the first cylindrical portion 305. By trimming the conduit access port 110 as such, the agent may ensure that a minimal part of the conduit access port 110 is exterior to the outer tube 115 and thus minimize a potential for breakage.

Once the agent has completed the installation of the fiber optic connector assembly 100, as shown in FIG. 6G, the service provider may provide a notification to the customer that the customer premises has Internet access via the umbrella fiber jack 105. Based on receiving the notification, the customer may connect a second fiber optic cable, which is connected to a device (e.g., an ONT, a modem, a router, a computer, and/or the like), to the umbrella fiber jack 105 to configure the device for Internet access. For example, the customer may insert a second connector of the second fiber optic cable into the second receptacle 230 of the umbrella fiber jack 105. Similar to that described above with respect to the connector 510, the second connector may include a standard connector, a straight tip connector, a ferrule connector, a physical contact connector, an angled physical contact connector, an ultra-physical contact connector, and/or the like. The second connector may attach with the second receptacle 230 via one or more attachment mechanisms (e.g., a snap-fit mechanism, a threaded mechanism, a twist mechanism, and/or the like).

By installing the fiber optic connector assembly 100 without entering the customer premises, the agent may conserve resources that might otherwise have been consumed by the customer and/or the agent. For example, the agent may conserve resources that might otherwise have been consumed by the customer taking a leave of absence from work, traveling to the customer premises, waiting at the customer premises, and/or the like. As a further example, the agent may conserve resources that the agent might otherwise have consumed navigating a vehicle to the customer premises at an inconvenient time and/or via an inconvenient route, taking precautions to enter the customer premises, and/or the like.

As indicated above, FIGS. 6A-6G are provided as an example. Other examples may differ from what is described with regard to FIGS. 6A-6G. The number and arrangement of devices shown in FIGS. 6A-6G are provided as an example. In practice, there may be additional devices, fewer devices, different devices, differently sized devices, differently shaped devices, or differently arranged devices than those shown in FIGS. 6A-6G. Furthermore, two or more devices shown in FIGS. 6A-6G may be implemented within a single device, or a single device shown in FIGS. 6A-6G may be implemented as multiple, distributed devices. Additionally, or alternatively, a set of devices (e.g., one or more devices) shown in FIGS. 6A-6G may perform one or more functions described as being performed by another set of devices shown in FIGS. 6A-6G.

Figure 7:
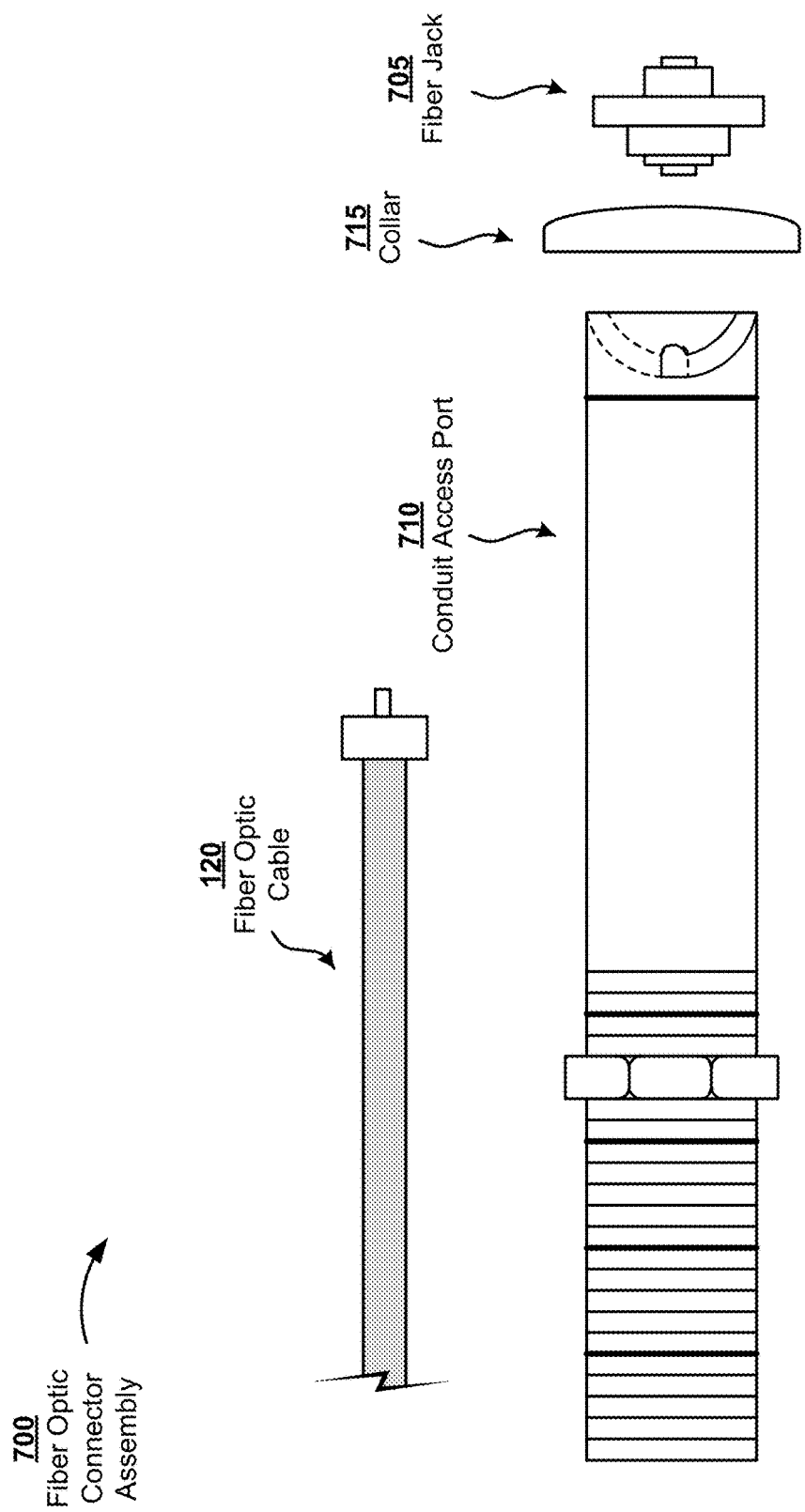
FIG. 7 is a side view of a fiber optic connector assembly, according to one or more aspects of the present disclosure, in a disassembled state.
Figure 8:
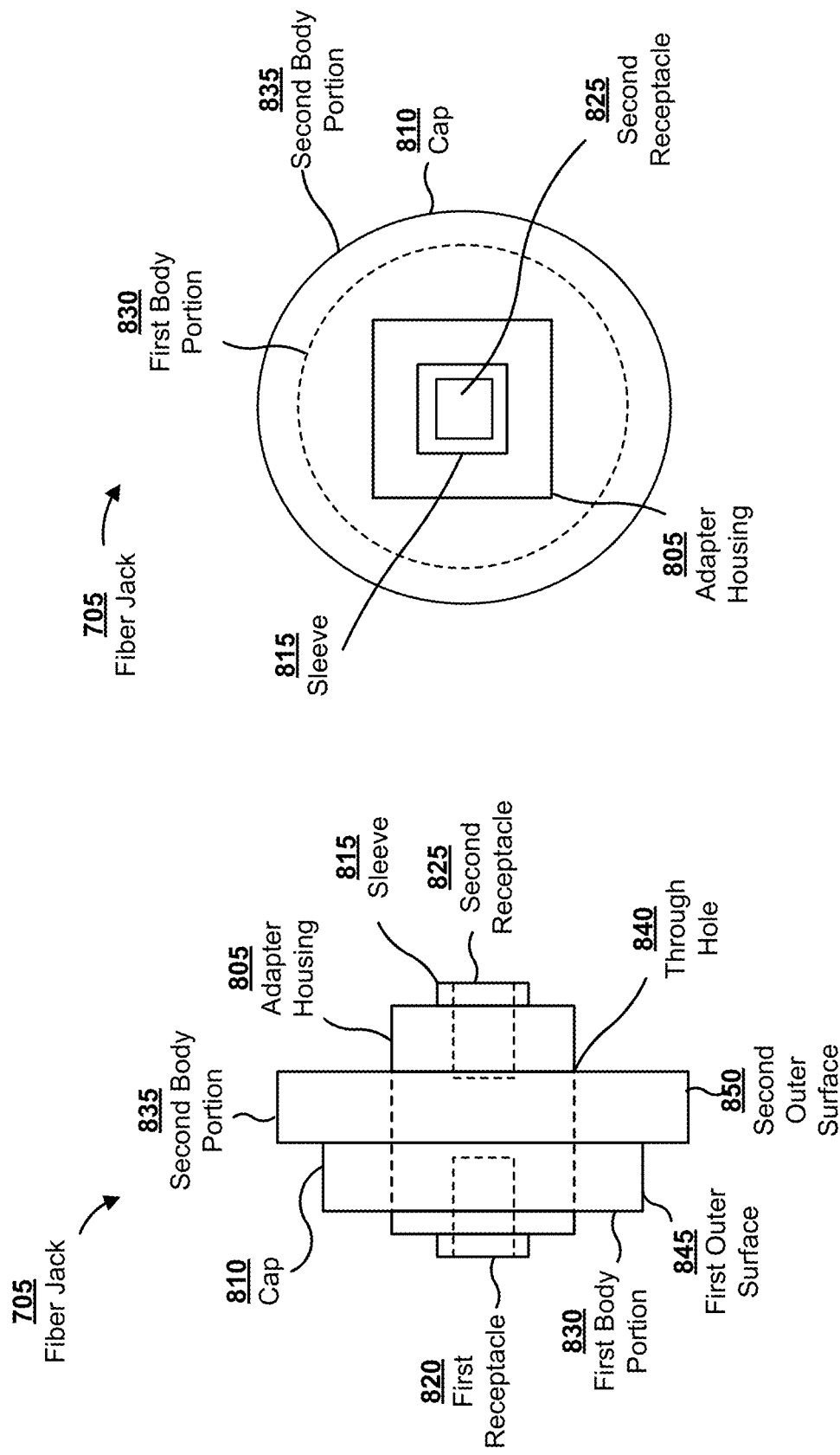
FIG. 8A is a side view of a fiber jack of the fiber optic connector assembly of FIG. 7.
FIG. 8B is a front view of the fiber jack of the fiber optic connector assembly of FIG. 7.

FIG. 7 is a side view of a fiber optic connector assembly 700, according to one or more aspects of the present disclosure, in a disassembled state. The fiber optic connector assembly 700 may include a fiber jack 705, a conduit access port 710, a collar 715, and the fiber optic cable 120. The collar 715 may be configured to be attached to the unit from an interior of the customer premises. The fiber jack 705 will be described below in connection with FIGS. 8A-8B. The conduit access port 710 will be described below in connection with FIG. 9. The collar 715 will be described below in connection with FIGS. 10A-10B.

The fiber jack 705, the conduit access port 710, and the fiber optic cable 120 may be configured to be attached together to form a unit and may be secured to an interior wall of a customer premises from an exterior of the customer premises. In other words, the fiber jack 705 is designed to be supported on a wall in an interior of the customer premises from the exterior of the customer premises and without access to the interior of the customer premises.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, differently sized devices, differently shaped devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

FIG. 8A is a side view of the fiber jack 705 of the fiber optic connector assembly 700. FIG. 8B is a front view of the fiber jack 705 of the fiber optic connector assembly 700.

As shown in FIGS. 8A-8B, the fiber optic connector assembly 700 may include an adapter housing 805 and a cap 810. The adapter housing 805, as shown in FIG. 8A, may contain a sleeve 815 having a first receptacle 820 optically coupled to a second receptacle 825. The first receptacle 820 may be configured to connect to a first fiber optic cable, which is connected to one or more devices of an Internet service provider. The second receptacle 825 may be configured to connect to a second fiber optic cable that is connected to a device within the customer premises (e.g., an optical network terminal (ONT), a modem, a router, a computer, and/or the like). Thus, once the first fiber optic cable is connected to the second fiber optic cable, via the adapter housing 805, the device may access the Internet.

The adapter housing 805 and/or the sleeve 815 may be formed of a non-conductive material, such as plastic (e.g., polyvinyl chloride (PVC), polyethylene (PE), and/or the like), and may be substantially rectangular prismatic in shape. The adapter housing 805 may be connected to the sleeve 815 via one or more attachment mechanisms, such as a snap-fit mechanism, a threaded mechanism, adhesive, and/or the like. In some implementations, the adapter housing 805 may be integrally formed with the sleeve 815. Other materials and/or shapes are possible.

The cap 810, as shown in FIG. 8A, may include a first body portion 830 and a second body portion 835. The cap 810 may be configured to attach the adapter housing 805 with the conduit access port 710. To attach the cap 810 to the adapter housing 805, cap 810 may include a through-hole 840 that extends through the first body portion 830 and the second body portion 835. The through-hole 840 may be configured to receive and engage with the adapter housing 805. For example, the through-hole 840 may have a substantially rectangular shape and be sized to engage (e.g., frictionally, adhesively, and/or the like) with an outer surface of the adapter housing 805. In some implementations, the cap 810 may be integrally formed with the adapter housing 805.

To attach the cap 810 to the conduit access port 710, the first body portion 830 may be configured to be inserted into and engage with the conduit access port 710. For example, the first body portion 830 may include a first outer surface 845 having a substantially circular shape and being sized to engage (e.g., frictionally, threadably, adhesively, and/or the like) with an inner surface of the conduit access port 710 (as will be described below in connection with FIG. 9). A second outer surface 850 of the second body portion 835 may likewise be substantially circular and, to facilitate attachment of the cap 810 to the conduit access port 710, may define a diameter larger than a diameter of the first outer surface 845 of the first body portion 830. The diameter of the second outer surface 850 of the second body portion 835 of the cap 810 may be substantially equal to a diameter of the conduit access port 710, which will be described in connection with FIG. 9 below.

The first body portion 830 and/or the second body portion 835 may be formed of a non-conductive material, such as plastic (e.g., PVC, PE, and/or the like). The first body portion 830 may be connected to the second body portion 835 via one or more attachment mechanisms, such as adhesive, a snap-fit mechanism, and/or the like. In some implementations, the first body portion 830 may be integrally formed with the second body portion 835.

As indicated above, FIGS. 8A-8B is provided as an example. Other examples may differ from what is described with regard to FIGS. 8A-8B. The number and arrangement of devices shown in FIGS. 8A-8B are provided as an example. In practice, there may be additional devices, fewer devices, different devices, differently sized devices, differently shaped devices, or differently arranged devices than those shown in FIGS. 8A-8B. Furthermore, two or more devices shown in FIGS. 8A-8B may be implemented within a single device, or a single device shown in FIGS. 8A-8B may be implemented as multiple, distributed devices. Additionally, or alternatively, a set of devices (e.g., one or more devices) shown in FIGS. 8A-8B may perform one or more functions described as being performed by another set of devices shown in FIGS. 8A-8B.

Figure 9:
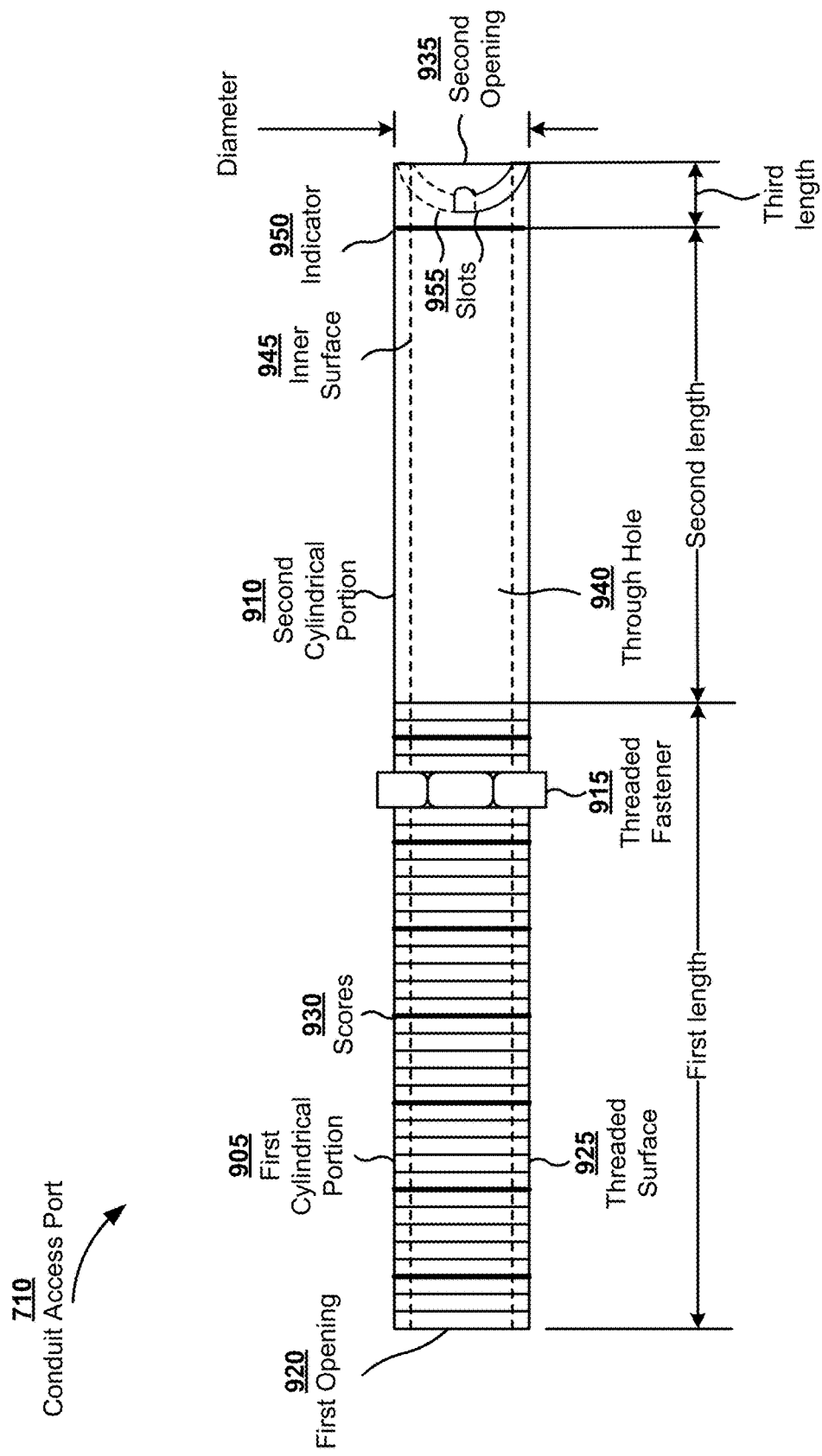
FIG. 9 is a side view of a conduit access port of the fiber optic connector assembly of FIG. 7.

FIG. 9 is a side view of conduit access port 710 of the fiber optic connector assembly 700. As shown in FIG. 9, the conduit access port 710 may include a first cylindrical portion 905, a second cylindrical portion 910 integrally connected to the first cylindrical portion 905, and a threaded fastener 915. The first cylindrical portion 905 may include a first opening 920, which is configured to receive the fiber jack 705, and a threaded surface 925 that is configured to engage with the threaded fastener 915. The threaded surface 925 may have a plurality of scores 930 spaced apart along a length of the first cylindrical portion 905. For example, the plurality of scores 930 may be spaced approximately 1.25 cm apart along the length of the first cylindrical portion 905. A score 930, of the plurality of scores 930, may cut into and substantially encircle the threaded surface 925 to allow the conduit access port 710 to be trimmed at a location of the score 930.

The second cylindrical portion 910 may include a second opening 935 that communicates with the first opening 920 to define a through-hole 940 in the conduit access port 710. The second opening 935 may be configured to receive and attach to the first body portion 830 of the cap 810 of the fiber jack 705. To attach to the first body portion 830, as described above in connection with FIGS. 8A-8B, the second opening 935 may include the inner surface 945, which may engage with the first outer surface 845 of the first body portion 830 (e.g., frictionally, threadably, adhesively, and/or the like). For example, the inner surface 945 of the conduit access port 710 may have a constant diameter that is substantially the same as a constant diameter of the first outer surface 845 of the first body portion 830. In such an example, the fiber jack 705 may be attached to the conduit access port 710 via a frictional and/or adhesive engagement. As another example, the inner surface 945 of the conduit access port 710 may include a thread that is configured to engage with a corresponding thread on the first outer surface 845 of the first body portion 830. In such an example, the fiber jack 705 may be attached to the conduit access port 710 via a threaded engagement.

In some implementations, the second cylindrical portion 910 may include an indicator 950 that is configured to facilitate installation of the fiber optic connector assembly 700 at a customer premises. For example, the indicator 950 may be a visual marking and/or a tactile marking that serves as a guide to a customer to ensure correct positioning of the conduit access port 710 relative to a wall (e.g., so that the second cylindrical portion 910 may receive the collar 715). Additionally, or alternatively, the second cylindrical portion 910 may include one or more slots 955 that are configured to receive and retain (e.g., via one or more spring mechanisms, and/or the like) one or more bayonet connectors of the collar 715, which will be described below in connection with FIGS. 10A-10B. The one or more slots 955 may be through-holes, indentations, or a combination of through-holes and indentations.

The first cylindrical portion 905 and/or the second cylindrical portion 910 may be formed of a non-conductive material, such as plastic (e.g., PVC, PE, and/or the like). The first cylindrical portion 905 may have a first length in a range from approximately 14 cm to approximately 16.5 cm and a first diameter of at least 1.9 cm. For example, the first length may be approximately 14 cm, and the first diameter may be approximately 1.9 cm. The second cylindrical portion 910 may have a second length, a third length, and a second diameter. The second length may be in a range from approximately 10.15 cm to approximately 12.7 cm. The third length may be in a range from approximately 1.25 cm to approximately 1.9 cm. The second diameter may be at least 1.9 cm. For example, the second length may be approximately 10.15 cm, the third length may be approximately 1.25 cm, and the second diameter may be approximately 1.9 cm. The first length, the second length, and the third length may together define a length of the conduit access port 710. For example, the length may be approximately 25.5 cm. The first diameter may be equal to the second diameter. Other materials and/or sizes are possible.

The threaded fastener 915, similar to that described above with respect to the threaded fastener 315, includes a structure that is configured to threadably engage with the threaded surface 925 of the first cylindrical portion 905. For example, the threaded fastener 915 may include a hex nut, a wing nut, and/or the like. The threaded fastener 915 may be utilized to secure the conduit access port 710 to a wall of a customer premises (e.g., the wall 610) and complete installation of the fiber optic connector assembly 700.

As indicated above, FIG. 9 is provided as an example. Other examples may differ from what is described with regard to FIG. 9. The number and arrangement of devices shown in FIG. 9 are provided as an example. In practice, there may be additional devices, fewer devices, different devices, differently sized devices, differently shaped devices, or differently arranged devices than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) shown in FIG. 9 may perform one or more functions described as being performed by another set of devices shown in FIG. 9.

FIG. 10A is a side view of the collar 715 of the fiber optic connector assembly 700. FIG. 10B is a front view of the collar 715 of the fiber optic connector assembly 700.

As shown in FIGS. 10A-10B, the collar 715 may include a body 1005 and a through-hole 1010 that extends therethrough to define a substantially cylindrical shape. The body 1005 may have the one or more bayonet connectors 1015 extending therefrom into the through-hole 1010. The collar 715 may be configured to be mounted onto the second cylindrical portion 910 of the conduit access port 710 to secure the fiber optic connector assembly 700 to a wall (e.g., the wall 610) of a customer premises. For example, the one or more bayonet connectors 1015 may be configured to be inserted into and pushed along the one or more slots 955 of the second cylindrical portion 910 of the conduit access port 710.

The collar 715 may be formed of a non-conductive material, such as plastic (e.g., PVC, PE, and/or the like). The collar 715 may have an inner diameter of at least 1.9 cm and an outer diameter in a range from approximately 5.1 cm to approximately 7.6 cm. For example, the inner diameter may be approximately 1.9 cm, and the outer diameter may be approximately 5.7 cm. Other materials and/or sizes are possible.

As indicated above, FIGS. 10A-10B are provided as an example. Other examples may differ from what is described with regard to FIGS. 10A-10B. For example, there may be additional devices, fewer devices, different devices, differently shaped devices, differently sized devices, or differently arranged devices than that shown in FIGS. 10A-10B.

Figure 11A:
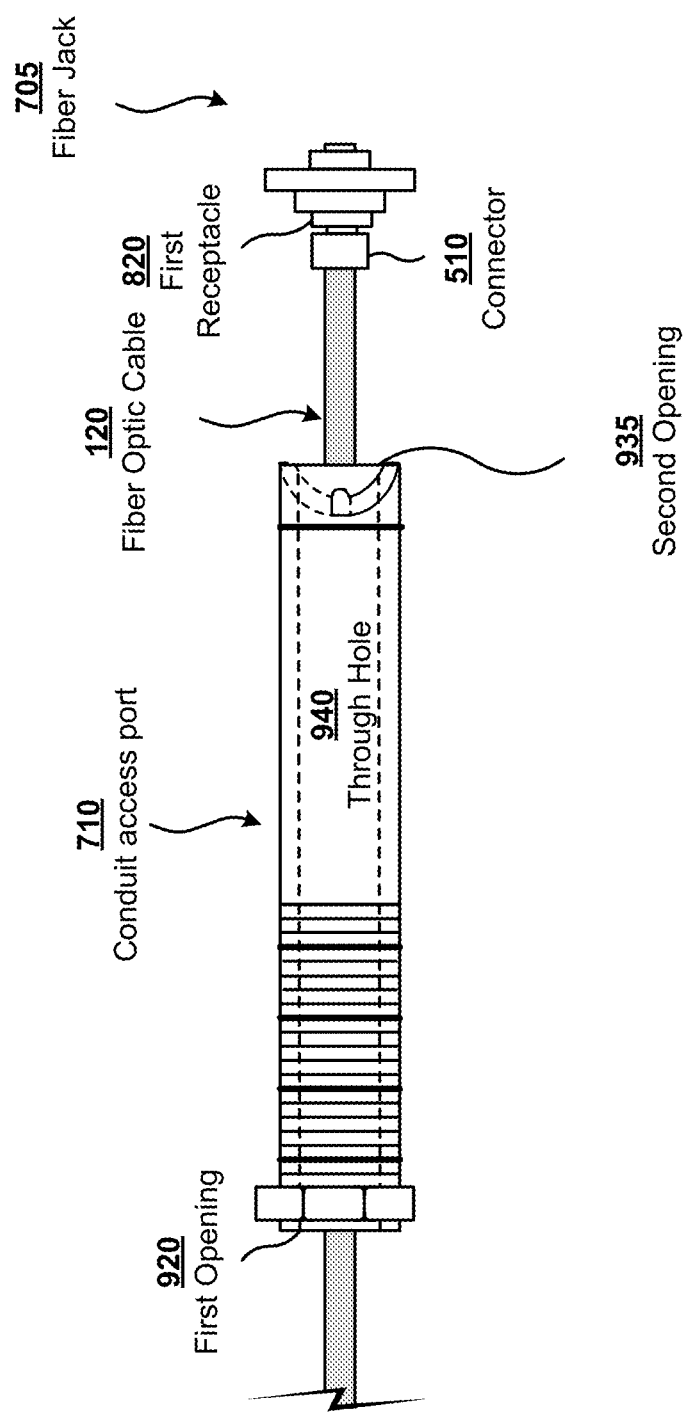
FIGS. 11A-11E are side views of the fiber optic connector assembly of FIG. 7 being utilized in an installation process.
Figure 11B:
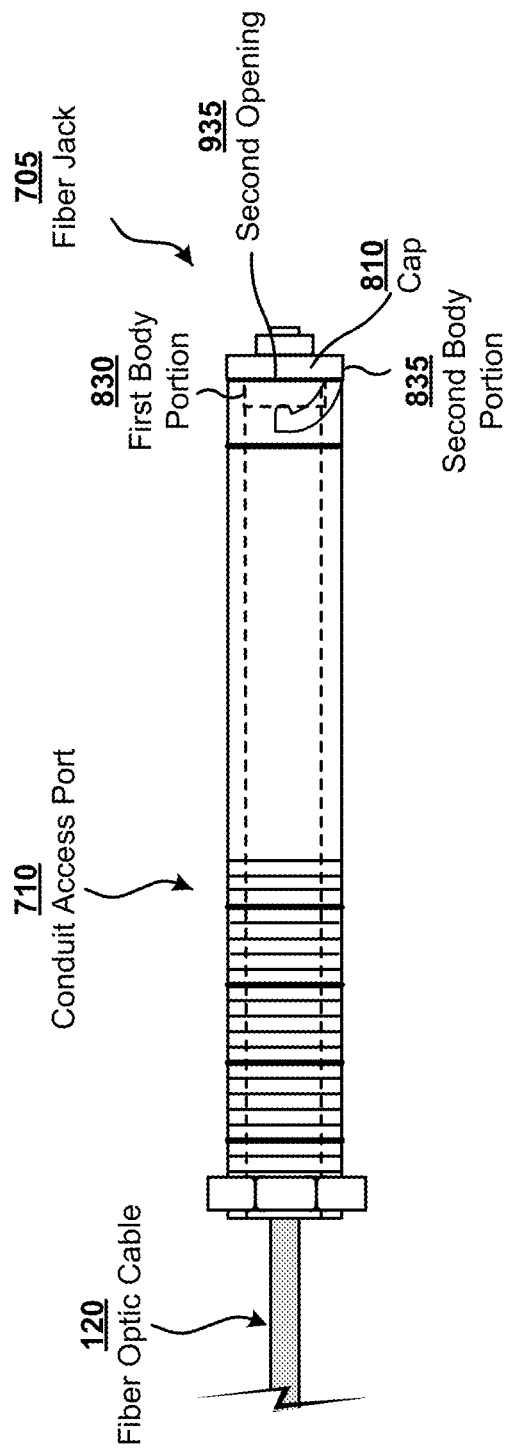
Figure 11C:
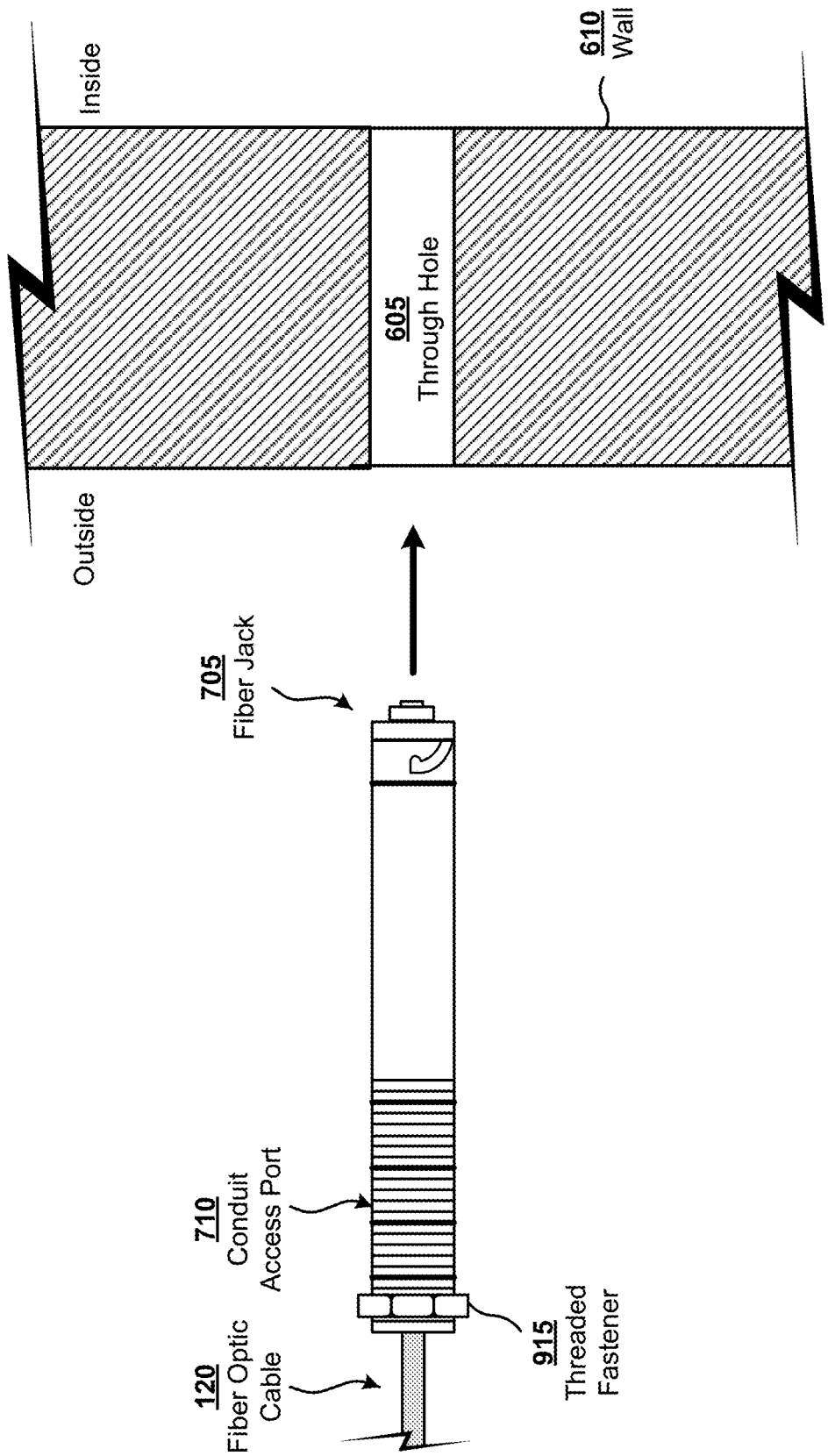
Figure 11D:
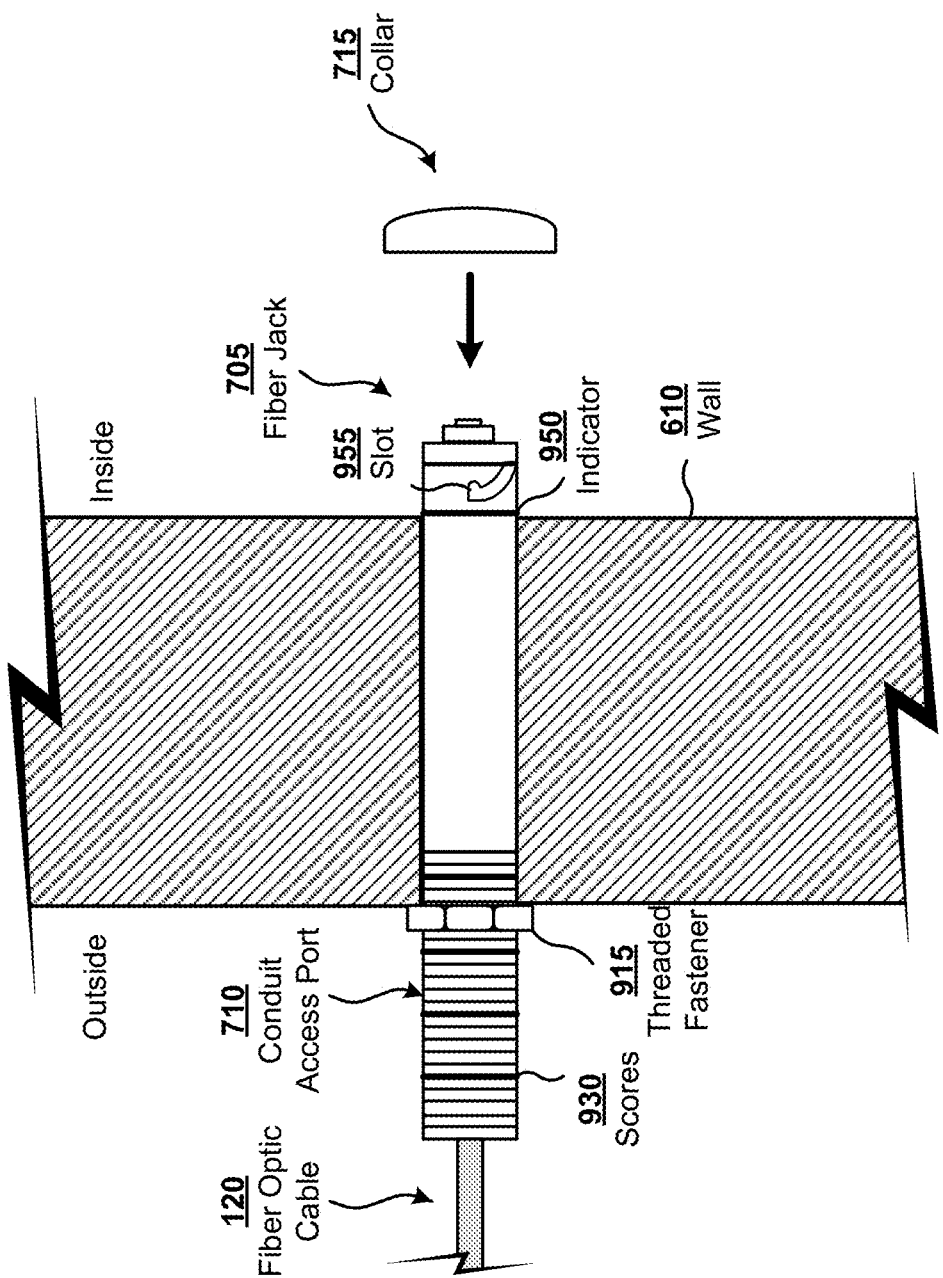
Figure 11E:
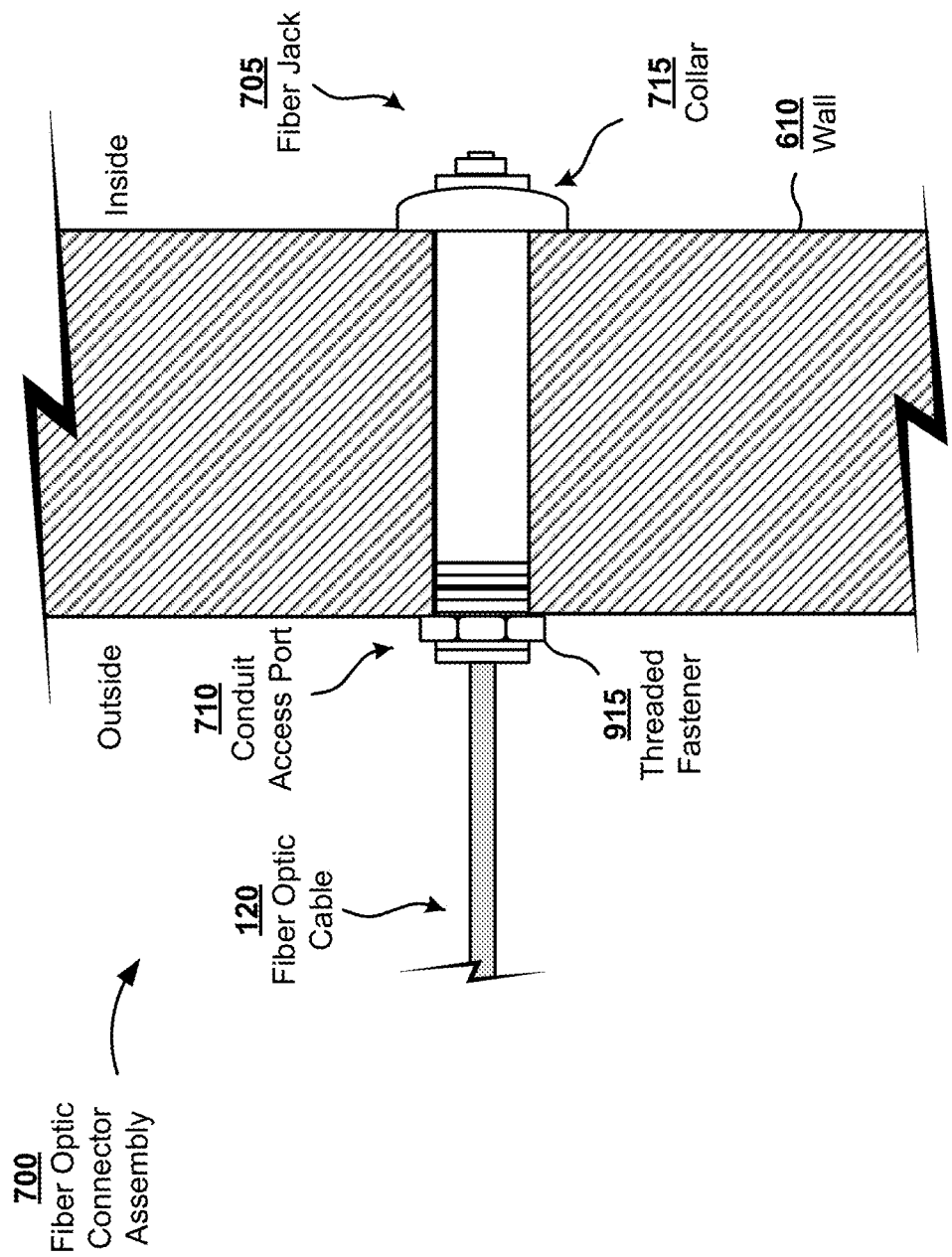

FIGS. 11A-11E are side views of the fiber optic connector assembly 700 being utilized in an installation process. FIG. 11A is a side view of the fiber optic cable 120 being fed through the conduit access port 710 and connected to the fiber jack 705. FIG. 11B is a side view of the fiber jack 705, along with the fiber optic cable 120, being attached to the conduit access port 710. FIG. 11C is a side view of the fiber jack 705, along with the fiber optic cable 120 and the conduit access port 710, being inserted into the through-hole 605 of the wall 610 of a customer premises. FIG. 11D is a side view of the fiber jack 705, along with the fiber optic cable 120 and the conduit access port 710, being pushed through the outer tube 115 such that the fiber jack 705 is exposed inside the customer premises to receive the collar 715. FIG. 11E is a side view of the fiber optic connector assembly 700 in a final state of the installation process.

For FIGS. 11A-11E, similar to that described above with respect to FIGS. 6A-6G, assume that a customer of a service provider contacted the service provider to obtain an Internet service plan and/or provide a request for installation of the fiber optic connector assembly 700 at the customer premises. The request for the installation may include an address of the customer premises, a requested time frame for the installation to occur, one or more requested installation points at the customer premises (e.g., a section of the wall 610 in which the through-hole 605 is to be provided), and/or the like.

Based on the request for the installation, the service provider may schedule an agent of the service provider (e.g., a technician, a fiber optic specialist, and/or the like) to meet the customer at the customer premises at the requested time frame. The agent may obtain and bring installation equipment, including the fiber jack 705, the conduit access port 710, the collar 715, the connector 510, and one or more tools (e.g., a drill, a wire stripper, and/or the like) to the customer premises.

Once on-site, the agent of the service provider may route the cable body 505 to the customer premises (e.g., from a pole or other structure near the customer premises) and attach the connector 510 to the cable body 505 to form the fiber optic cable 120. The agent may provide the collar 715 to the customer for the customer to install. In some implementations, to limit physical contact between the agent and the customer (e.g., due to a public health event, such as an infectious disease outbreak, and/or the like), the service provider may ship the collar 715 to the customer prior to the requested time frame. While remaining outside the customer premises, the agent may begin the installation process at a selected installation point of the one or more requested installation points at the customer premises.

As shown in FIG. 11A, the agent may attach the fiber optic cable 120 with the fiber jack 705. For example, the agent may insert the fiber optic cable 120 into the first opening 920 of the conduit access port 710 and feed the fiber optic cable 120 through the through-hole 940. After pushing the fiber optic cable 120 through the second opening 935 of the conduit access port 710, the agent may insert the connector 510 of the fiber optic cable 120 into the first receptacle 820 of the fiber jack 705. The connector 510 may attach with the first receptacle 820 via one or more attachment mechanisms (e.g., a snap-fit mechanism, a threaded mechanism, a twist mechanism, and/or the like).

As shown in FIG. 11B, the agent may attach the fiber jack 705, along with fiber optic cable 120, with the conduit access port 710. For example, the agent may insert the first body portion 830 of the cap 810 of the fiber jack 705 into the second opening 935 of the conduit access port 710. The first outer surface 845 of the first body portion 830 may engage (e.g., frictionally, threadably, adhesively, and/or the like) the inner surface 945 of the conduit access port 710 to define an attachment. Thus, because the fiber optic cable 120 is secured to the fiber jack 705, which is in turn secured to the conduit access port 710, the fiber optic cable 120, the fiber jack 705, and the conduit access port 710 may be held together as a subassembly unit.

As shown in FIG. 11C, while the agent remains outside of the customer premises, the agent may press a drill into an exterior surface of the selected installation point of the wall 610 to provide the through-hole 605 in the wall 610. The through-hole 605 may have substantially the same diameter as the diameter of the conduit access port 710. The agent may insert the fiber jack 705, along with the fiber optic cable 120, and the conduit access port 710, into the through-hole 605 of the wall 610. For example, the agent may grasp and push the subassembly unit from an exterior of the through-hole 605 into the customer premises. Because the threaded fastener 915 is attached to an end of the conduit access port 710, the threaded fastener 915 may prevent the end of the conduit access portion 710 from being inserted into the through-hole 605 of the wall 610 and to thus remain accessible by the agent.

As shown in FIG. 11D, the agent may push the fiber jack 705, along with the fiber optic cable 120 and the conduit access port 710, through the through-hole 605 such that the indicator 950 is substantially flush with an interior surface of the wall 610. In some implementations, at this point in the installation process, the agent may contact the customer to confirm that the indicator 950 is substantially flush with the interior surface and to request that the customer mount the collar 715 onto the conduit access port 710 via the one or more slots 955. Based on the request, the customer may push the collar 715 onto the conduit access port 710 and apply a one-quarter turn to the collar 715. One or more spring mechanisms associated with the one or more slots 955 may push the collar 715 towards the fiber jack 705 to lock the collar 715 into place.

As further shown in FIG. 11D, the agent may thread the threaded fastener 915 onto the conduit access port 710 to clamp the wall 610 between the threaded fastener 915 and the collar 715. For example, the agent may twist the threaded fastener 915 (e.g., manually, using a wrench, and/or the like) along the threaded surface 925 until the threaded fastener 915 contacts an exterior surface of the wall 610. Thus, by threading the threaded fastener 915 onto the conduit access port 710, the agent may secure the fiber jack 705, the conduit access port 710, the collar 715, and the fiber optic cable 120 to the wall 610 of the customer premises.

In some implementations, to complete the installation process, the agent may trim the conduit access port 710. For example, the agent may cut the conduit access port 710 along a score 930, of the plurality of scores 930, and remove a portion of the first cylindrical portion 905. By trimming the conduit access port 710 as such, the agent may ensure that a minimal part of the conduit access port 710 is exterior to the outer tube 115 and thus minimize a potential for breakage.

Once the agent has completed the installation of the fiber optic connector assembly 700, as shown in FIG. 11E, the service provider may provide a notification to the customer that the customer premises has Internet access via the fiber jack 705. Based on receiving the notification, the customer may connect a second fiber optic cable, which is connected to a device (e.g., an ONT, a modem, a router, a computer, and/or the like), to the fiber jack 705 to configure the device for Internet access. For example, the customer may insert a second connector of the second fiber optic cable into the second receptacle 825 of the fiber jack 705. Similar to that described above, the second connector may include a standard connector, a straight tip connector, a ferrule connector, a physical contact connector, an angled physical contact connector, an ultra-physical contact connector, and/or the like. The second connector may attach with the second receptacle 825 via one or more attachment mechanisms (e.g., a snap-fit mechanism, a threaded mechanism, a twist mechanism, and/or the like).

Because the fiber optic connector assembly 700 has the collar 715, rather than the umbrella support 215 and the outer tube 115, the fiber optic connector assembly 700 may have a simpler manufacturing process and/or require fewer materials. Thus, the fiber optic connector assembly 700 may conserve costs and resources that might otherwise have been consumed manufacturing the fiber optic connector assembly 100. Furthermore, similar to that described above with respect to the fiber optic connector assembly 100, by installing the fiber optic connector assembly 700 without entering the customer premises, the agent may conserve resources that might otherwise have been consumed taking one or more health precautions, such as obtaining and wearing protective personal equipment (e.g., a mask, gloves, and/or the like), obtaining and using cleaning agents (e.g., hand sanitizer, bleach, and/or the like), and/or the like.

As indicated above, FIGS. 11A-11E are provided as an example. Other examples may differ from what is described with regard to FIGS. 11A-11E. The number and arrangement of devices shown in FIGS. 11A-11E are provided as an example. In practice, there may be additional devices, fewer devices, different devices, differently sized devices, differently shaped devices, or differently arranged devices than those shown in FIGS. 11A-11E. Furthermore, two or more devices shown in FIGS. 11A-11E may be implemented within a single device, or a single device shown in FIGS. 11A-11E may be implemented as multiple, distributed devices. Additionally, or alternatively, a set of devices (e.g., one or more devices) shown in FIGS. 11A-11E may perform one or more functions described as being performed by another set of devices shown in FIGS. 11A-11E.

A first type of fiber optic connector assembly (e.g., fiber optic connector assembly 100) has been described in connection with FIGS. 1-6G. A second type of fiber optic connector assembly (e.g., fiber optic connector assembly 700) has been described in connection with FIGS. 7-11E. In practice, a type of fiber optic connector assembly can be used that is a hybrid or combination of the first type of fiber optic connector assembly and the second type of fiber optic connector assembly. Thus, in some implementations, a fiber optic connector assembly may include any combination of one or more features of the first type of fiber optic connector assembly and one or more features of the second type of connector assembly. For example, a fiber optic connector assembly may be used that includes a conduit access port (e.g., conduit access port 710) and that includes one or more umbrella portions (e.g., umbrella portions 260) and a collar (e.g., collar 715). In some implementations, one or more components of the first type of fiber optic connector assembly and one or more components of the second type of fiber optic connection assembly may be used as part of an interchangeable system. For example, the interchangeable system may include the conduit access port 710, the umbrella fiber jack 105, the fiber jack 705, the outer tube 115, the collar 715, and the fiber optic cable 120. In some cases, an agent may use the conduit access port 710, of the interchangeable system, with the umbrella fiber jack 105, the outer tube 115, and the fiber optic cable 120. In other cases, the agent may use the conduit access port 710, of the interchangeable system, as described above with respect to the second type of fiber optic connector assembly. Other combinations of features and/or components are possible.

Figure 12:
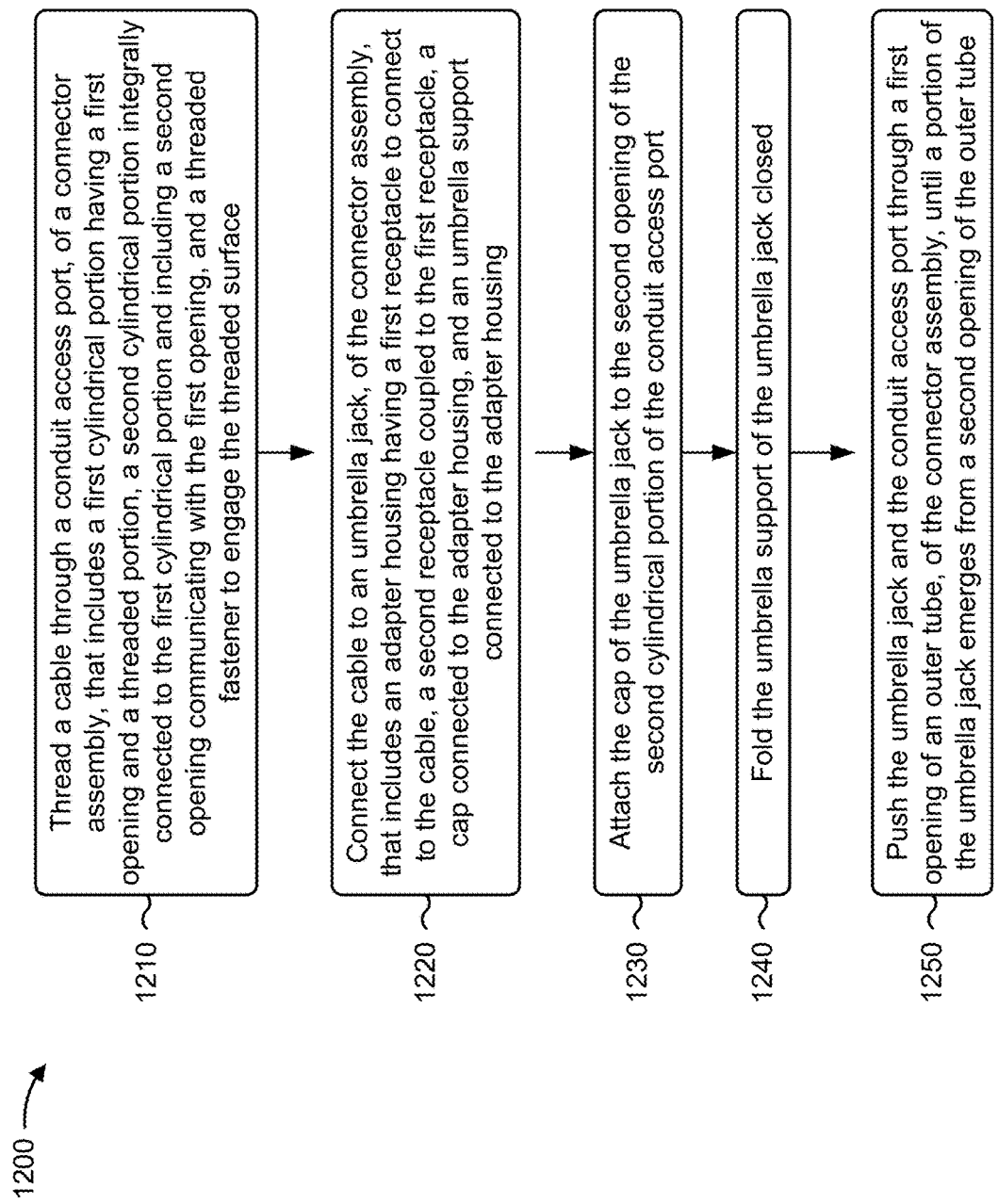
FIG. 12 is a flow chart of an example process relating to installation of a fiber optic connector assembly from an exterior of the customer premises.

FIG. 12 is a flow chart of an example process 1200 associated with utilizing a connector assembly. While process 1200 will be described in the context of an umbrella jack, such as the umbrella fiber jack described in connection with FIGS. 1-6G, process 1200 equally applies to other types of jacks, such as the fiber jack described in connection with FIGS. 7-11E.

As shown in FIG. 12, process 1200 may include feeding a cable through a conduit access port, of the connector assembly, that includes a first cylindrical portion having a first opening and a threaded surface, a second cylindrical portion integrally connected to the first cylindrical portion and including a second opening communicating with the first opening, and a threaded fastener communicating with the first opening (block 1210). In some implementations, the first cylindrical portion of the conduit access port may include a plurality of scores.

As further shown in FIG. 12, process 1200 may include connecting the cable to an umbrella jack, of the connector assembly, that includes an adapter housing having a first receptacle to connect to the cable, and a second receptacle coupled to the first receptacle, a cap connected to the adapter housing, and an umbrella support connected to the adapter housing (block 1220). The first receptacle of the adapter housing may be configured to receive a first connector of the cable, and the second receptacle of the adapter housing may be configured to receive a second connector of one or more network devices. The umbrella support may include a plurality of umbrella portions connected to the adapter housing.

As further shown in FIG. 12, process 1200 may include attaching the cap of the umbrella jack to the second opening of the second cylindrical portion of the conduit access port (block 1230). In some implementations, attaching the cap of the umbrella jack to the first opening of the first cylindrical portion of the conduit access port may include one of: attaching the cap within the second opening of the conduit access port via threads provided on an outer surface of the cap and within an inner surface the second cylindrical portion, or attaching the cap within the second opening of the conduit access port via a frictional engagement between the outer surface of the cap and the inner surface of the second cylindrical portion.

As further shown in FIG. 12, process 1200 may include folding the umbrella support of the umbrella jack closed (block 1240). Folding the umbrella support closed may comprise folding the plurality of umbrella portions closed to enable the outer tube to receive the umbrella jack.

As further shown in FIG. 12, process 1200 may include pushing the umbrella jack and the conduit access port through a first opening of an outer tube, of the connector assembly, until a portion of the umbrella jack emerges from a second opening of the outer tube (block 1250).

Process 1200 may further include inserting the outer tube of the connector assembly through a through-hole provided within a wall of a customer premises and from outside of the customer premises; pushing the conduit access port through the outer tube until the umbrella jack is exposed inside the customer premises; pulling the conduit access port back toward the wall to open the umbrella support of the umbrella jack against an interior surface of the wall; and tightening the threaded fastener along the threaded surface of the conduit access port to contact the outer tube and secure the optic connector assembly to the wall of the customer premises.

Process 1200 may further include removing a portion of the first cylindrical portion via the plurality of scores and based on a size of the through-hole provided within the wall of the customer premises.

Process 1200 may further include drilling a through-hole through a wall of a customer premises and from outside of the customer premises; and inserting the outer tube of the optic connector assembly through the through-hole of the wall of the customer premises and from outside of the customer premises.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A connector assembly, comprising:
an umbrella jack to be installed via a through-hole provided within a wall of a customer premises, the umbrella jack including:
an adapter housing, the adapter housing including:
a first receptacle to connect to a cable, and
a second receptacle coupled to the first receptacle and configured to be provided inside the customer premises,
a cap connected to the adapter housing, and
an umbrella support connected to the adapter housing and configured to engage an interior surface of the wall of the customer premises;
a conduit access port to receive the umbrella jack and including:
a first cylindrical portion including a first opening to receive the umbrella jack and including a threaded surface,
a second cylindrical portion integrally connected to the first cylindrical portion and including a second opening to attach to the cap of the umbrella jack, and
a threaded fastener to engage the threaded surface and to secure the conduit access port to an outer tube; and
the outer tube having a third opening to receive the umbrella jack and the conduit access port and config- ured to be provided in the through-hole provided within the wall of the customer premises from an exterior of the wall.

2. The connector assembly of claim 1, wherein the cable is provided through the conduit access port and is attached to the adapter housing via the first receptacle of the adapter housing.

3. The connector assembly of claim 1, wherein the cap of the umbrella jack is sized and shaped to be attached within the second opening of the conduit access port via threads provided on an outer surface of the cap and within an inner surface the second cylindrical portion or via a frictional engagement between the outer surface of the cap and the inner surface of the second cylindrical portion.

4. The connector assembly of claim 1, wherein the umbrella support comprises:
   a plurality of umbrella portions connected to the adapter housing,
      wherein the plurality of umbrella portions are folded closed to enable the outer tube to receive the umbrella jack, and
      wherein the plurality of umbrella portions are folded open and engage the interior surface of the wall of the customer premises when the connector assembly is installed in the through-hole provided within the wall of the customer premises.

5. The connector assembly of claim 1, wherein the first cylindrical portion of the conduit access port includes a plurality of scores to enable a portion of the first cylindrical portion to be removed based on a size of the through-hole provided within the wall of the customer premises.

6. The connector assembly of claim 1, wherein the cable is a first fiber optic cable having a first connector,
   the first connector including one of:
      a standard connector,
      a straight tip connector,
      a ferrule connector,
      a physical contact connector,
      an angled physical contact connector, or
      an ultra-physical contact connector;
   wherein the first receptacle of the adapter housing is configured to receive the first connector; and
   wherein the second receptacle of the adapter housing is configured to receive a second connector of a second fiber optic cable within the customer premises,
   the second connector including one of:
      a standard connector,
      a straight tip connector,
      a ferrule connector,
      a physical contact connector,
      an angled physical contact connector, or
      an ultra-physical contact connector.

7. The connector assembly of claim 1, wherein:
   the umbrella support comprises a plastic material and a diameter in a range from approximately 5.1 centimeters to approximately 7.6 centimeters,
   the first cylindrical portion comprises a non-conductive material and a diameter of at least 1.9 centimeters, and
   the outer tube comprises a non-conductive material and diameter in a range from approximately 2.2 centimeters to approximately 2.5 centimeters.

8. A method for utilizing a connector assembly, comprising:
   feeding a cable through a conduit access port, of the connector assembly, that includes:
      a first cylindrical portion having a first opening and a threaded surface,
      a second cylindrical portion integrally connected to the first cylindrical portion and including a second opening communicating with the first opening, and
      a threaded fastener to engage the threaded surface;
   connecting the cable to an umbrella jack, of the connector assembly, that includes:
      an adapter housing having:
         a first receptacle to connect to the cable, and
         a second receptacle coupled to the first receptacle,
      a cap connected to the adapter housing, and
      an umbrella support connected to the adapter housing;
   attaching the cap of the umbrella jack to the second opening of the second cylindrical portion of the conduit access port;
   folding the umbrella support of the umbrella jack closed; and
   pushing the umbrella jack and the conduit access port through a first opening of an outer tube, of the connector assembly, until a portion of the umbrella jack emerges from a second opening of the outer tube.

9. The method of claim 8, further comprising:
   inserting the outer tube of the connector assembly through a through-hole provided within a wall of a customer premises and from outside of the customer premises;
   pushing the conduit access port through the outer tube until the umbrella jack is exposed inside the customer premises;
   pulling the conduit access port back toward the wall to cause the umbrella jack to contact an interior surface of the wall; and
   tightening the threaded fastener along the threaded surface of the conduit access port to contact the outer tube and secure the connector assembly to the wall of the customer premises.

10. The method of claim 9, wherein the first cylindrical portion of the conduit access port includes a plurality of scores, and the method further comprises:
    removing a portion of the first cylindrical portion via the plurality of scores and based on a size of the through-hole provided within the wall of the customer premises.

11. The method of claim 8, wherein attaching the cap of the umbrella jack to the first opening of the first cylindrical portion of the conduit access port comprises one of:
    attaching the cap within the second opening of the conduit access port via threads provided on an outer surface of the cap and within an inner surface the second cylindrical portion, or
    attaching the cap within the second opening of the conduit access port via a frictional engagement between the outer surface of the cap and the inner surface of the second cylindrical portion.

12. The method of claim 8, further comprising:
    drilling a through-hole through a wall of a customer premises and from outside of the customer premises; and
    inserting the outer tube of the connector assembly through the through-hole of the wall of the customer premises and from outside of the customer premises.

13. The method of claim 8, wherein:
    the first receptacle of the adapter housing is configured to receive a first connector of the cable, and
    the second receptacle of the adapter housing is configured to receive a second connector of one or more network devices.

14. The method of claim 8, wherein the umbrella support includes a plurality of umbrella portions connected to the adapter housing; and wherein folding the umbrella support closed comprises:
folding the plurality of umbrella portions closed to enable the outer tube to receive the umbrella jack.

15. A fiber optic connector assembly, comprising:
a conduit access port including:
a first cylindrical portion that includes a first opening and a threaded surface,
a second cylindrical portion integrally connected to the first cylindrical portion and including a second opening communicating with the first opening, and
a threaded fastener to engage the threaded surface of the first cylindrical portion and to secure the conduit access port within a first through-hole extending through a wall of a customer premises;
an adapter housing to connect to a fiber optic cable provided through the first cylindrical portion and the second cylindrical portion; and
a cap to attach to the second cylindrical portion and including a second through-hole to receive and retain the adapter housing,
wherein the cap includes a first body portion and a second body portion,
wherein the first body portion has a diameter that is less than a diameter of the second body portion, and
wherein the first body portion is sized and shaped to fit within the second opening of the second cylindrical portion.

16. The fiber optic connector assembly of claim 15, further comprising an umbrella support connected to the adapter housing and configured to engage an interior surface of the wall of the customer premises.

17. The fiber optic connector assembly of claim 15, further comprising a collar to secure an end of the second cylindrical portion against an interior surface of the wall of the customer premises.

18. The fiber optic connector assembly of claim 17, wherein the collar comprises:
a substantially cylindrical body having a third through-hole; and
one or more bayonet connectors extending from the substantially cylindrical body into the third through-hole,
wherein the one or more bayonet connectors secure the end of the second cylindrical portion against an interior surface of the wall of the customer premises via one or more slots provided in the end of the second cylindrical portion.

19. The fiber optic connector assembly of claim 17, wherein:
the first cylindrical portion comprises a non-conductive material, a diameter of at least 1.9 centimeters, and a length in a range from approximately 14 centimeters to approximately 16.5 centimeters,
the second cylindrical portion comprises a non-conductive material, a diameter of at least 1.9 centimeters, and a length in a range from approximately 11.4 centimeters to approximately 14 centimeters,
the cap comprises a non-conductive material and a diameter of at least 1.9 centimeters, and
the collar comprises a plastic material and a diameter in a range from approximately 5.1 centimeters to approximately 7.6 centimeters.

20. The fiber optic connector assembly of claim 15, wherein the first cylindrical portion includes a plurality of scores to enable a portion of the first cylindrical portion to be removed based on a size of the first through-hole of the wall of the customer premises.

* * * * *

UNITED STATES PATENT AND TRADEMARK OFFICE
CERTIFICATE OF CORRECTION

PATENT NO. : 11,156,784 B1
APPLICATION NO. : 16/929674
DATED : October 26, 2021
INVENTOR(S) : Meaghan Leong et al.

Page 1 of 1

It is certified that error appears in the above-identified patent and that said Letters Patent is hereby corrected as shown below:

On the Title Page

Item (72), should read as follows:
(72) Inventors: Meaghan Leong, Marshfield, MA (US);
Richard J. Kimmick, Asbury, NJ (US);
Darrin J. Luce, Morrisville, NY (US);
Alex M. Madonna, Spring Lake Heights, NJ (US); Aidan J. O'Donoghue, Marshfield, MA (US)

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*